United States Patent
Su et al.

(10) Patent No.: US 9,743,452 B2
(45) Date of Patent: Aug. 22, 2017

(54) ADAPTIVE RECEPTION OF LTE IN A SINGLE RADIO WIRELESS DEVICE

(71) Applicant: Apple Inc., Cupertino, CA (US)

(72) Inventors: Li Su, San Jose, CA (US); Tarik Tabet, Los Gatos, CA (US); Navid Damji, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/498,861

(22) Filed: Sep. 26, 2014

(65) Prior Publication Data

US 2015/0092708 A1    Apr. 2, 2015

Related U.S. Application Data

(60) Provisional application No. 61/884,903, filed on Sep. 30, 2013.

(51) Int. Cl.
*H04W 76/02* (2009.01)
*H04W 88/06* (2009.01)
*H04W 72/04* (2009.01)

(52) U.S. Cl.
CPC ........ *H04W 76/026* (2013.01); *H04W 72/042* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2006/0176870 A1* | 8/2006 | Joshi | H04W 88/06 370/345 |
| 2009/0247091 A1* | 10/2009 | Jalloul | H04W 24/00 455/70 |
| 2010/0157829 A1* | 6/2010 | Jonsson | H04L 1/0026 370/252 |
| 2010/0260147 A1* | 10/2010 | Xing | H04K 3/226 370/332 |
| 2011/0032901 A1* | 2/2011 | Xiang | H04W 36/0016 370/331 |
| 2013/0201890 A1* | 8/2013 | Swaminathan | H04W 88/06 370/311 |

(Continued)

*Primary Examiner* — Chi H Pham
*Assistant Examiner* — Vladislav Agureyev
(74) *Attorney, Agent, or Firm* — Downey Brand LLP

(57) ABSTRACT

Methods, apparatuses and computer-readable media are described that configure wireless circuitry of a wireless device. The wireless device establishes a connection to a first wireless network using first and second receiving signaling chains. The wireless device obtains a configuration processing delay time for the first wireless network and sends a first channel status report having a rank indicator value of one before starting a tune-away event at a time based on the obtained configuration processing delay time. The wireless device reconfigures at least one of the radio frequency signaling chains to receive signals from a second wireless network during the tune-away event. The wireless device subsequently sends a second channel status report having a rank indicator value greater than one before ending the tune-away event and reconfiguring the at least one of the radio frequency receive signaling chains back to the first wireless network.

20 Claims, 13 Drawing Sheets

(56) References Cited

U.S. PATENT DOCUMENTS

| | | | |
|---|---|---|---|
| 2013/0244656 A1* | 9/2013 | Heo | H04W 52/243 455/436 |
| 2013/0272218 A1* | 10/2013 | Cui | H04W 72/08 370/329 |
| 2013/0303181 A1* | 11/2013 | Rajurkar | H04W 72/0453 455/452.1 |
| 2014/0029586 A1* | 1/2014 | Loehr | H04W 56/0005 370/336 |
| 2014/0185520 A1* | 7/2014 | Gao | H04W 64/00 370/328 |
| 2014/0274051 A1* | 9/2014 | Hsu | H04W 36/20 455/436 |
| 2014/0301493 A1* | 10/2014 | Govindswamy | H04B 7/0817 375/267 |
| 2014/0308986 A1* | 10/2014 | Yang | H04W 88/06 455/552.1 |
| 2015/0029873 A1* | 1/2015 | Subramanian | G01S 5/14 370/252 |
| 2015/0271755 A1* | 9/2015 | Karri | H04W 52/0229 370/252 |

* cited by examiner

ADAPTIVE RECEPTION OF LTE IN A SINGLE RADIO WIRELESS DEVICE

CROSS REFERENCE TO RELATED APPLICATIONS

This application claims the benefit of U.S. Provisional Application No. 61/884,903, filed Sep. 30, 2013 and entitled "METHOD FOR ADAPTIVE RECEPTION OF LTE IN A SINGLE RADIO WIRELESS DEVICE", which is incorporated by reference herein in its entirety for all purposes.

FIELD

The described embodiments generally relate to methods and apparatuses for managing connections between wireless communication devices and wireless networks. More particularly, the present embodiments describe configuring wireless circuitry in a single radio wireless communication device to receive signals from a Long Term Evolution (LTE) wireless network and from a legacy third generation (3G) wireless network singly or simultaneously based on operating conditions and requirements.

BACKGROUND

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of wireless communication devices. Wireless communication devices can include hardware and software to support wireless connections to different types of wireless networks that use different wireless communication technologies. Wireless networks using different radio access technologies (RATs) can overlap in geographic area coverage, and wireless communication devices can support connections using different RATs depending on services and/or coverage available. A wireless service provider can provide services to wireless communication devices through overlapping wireless networks, and wireless communication devices can connect to one or more of the overlapping wireless networks. In a representative embodiment, a wireless service provider and/or a wireless communication device can include simultaneous support for a Third Generation Partnership Project (3GPP) Long Term Evolution (LTE) or Long Term Evolution Advanced (LTE-A) wireless communication protocol and a "legacy" third generation (and/or earlier generation) wireless communication protocol. Representative "legacy" protocols include the Third Generation Partnership Project 2 (3GPP2) Code Division Multiple Access (CDMA) 2000 1x (also referred to as 1xRTT or 1x) wireless communication protocol, the 3GPP Universal Mobile Telecommunications System (UMTS) wireless communication protocol, and the 3GPP Global System for Mobile Communications (GSM) wireless communication protocol.

Dual chip (also referred to as dual radio) wireless communication devices can include separate signal processing chips that each can support a different wireless communication protocol, such as a first signal processing chip for a CDMA 2000 1x wireless network and a second signal processing chip for a LTE wireless network. In particular, in a dual chip wireless communication device, each signal processing chip can include and/or be associated with its own set of receive signal processing chains, including in some instances multiple receive antennas and parallel signal processing blocks. With at least one radio frequency receive signaling chain being available to each signal processing chip independently in the dual chip wireless communication device and individually tunable to different carrier frequencies, signaling messages (e.g., pages) and/or references signals (e.g., for cell selection/reselection measurement) can be received independently and simultaneously from two different wireless networks, such as from the CDMA 2000 1x wireless network and from the LTE wireless network. Even when the dual chip wireless communication device is connected and actively transferring data through one of the signal processing chips to one of the wireless networks, such as the LTE wireless network, the dual chip wireless communication device can also listen for and receive a paging message or measure signals through the other parallel signal processing chip from a second wireless access network, such as the CDMA 2000 1x wireless network. A dual chip wireless communication device with at least two transmitters and at least two receivers can establish a mobile device originating or mobile device terminating circuit-switched voice connection through the CDMA 2000 1x wireless network while also being actively connected to (or simultaneously camped on) a packet-switched LTE wireless network. The dual chip wireless communication device can also provide a connection on the CDMA 2000 1x wireless network, while also maintaining a connection (or at least listening for signals and messages) on the LTE wireless network. Dual chip wireless communication devices, however, can consume more power, can require a larger physical form factor and can require additional components (and cost more) than a more integrated wireless communication device.

A single chip (also referred to as a single radio) wireless communication device, at least in some configurations, can include a signal processing chip that can support different wireless communications protocols but can be unable to be actively connected to and communicate bi-directionally with a first wireless network and a second wireless network simultaneously. The single radio wireless communication device can support multiple wireless communication technologies, such as connections to a CDMA 2000 1x wireless network and to an LTE wireless network, but only to one wireless network at any given time. In some configurations, a single radio wireless communication device can be limited to receiving signals that use one wireless communication technology type at a time, particularly when multiple antennas are used to receive signals for a single communication technology that supports multiple input multiple output (MIMO) and/or receive diversity. In a representative embodiment, a single radio wireless communication device is able to connect to or camp on an evolved Universal Mobile Telecommunications System (UMTS) Terrestrial Radio Access Network (eUTRAN) of an LTE (or LTE-Advanced) wireless network and also to connect to or camp on a radio access network (RAN) of the CDMA 2000 1x wireless network, but is not able to communication bi-directionally to both wireless networks simultaneously. The single radio wireless communication device can be registered on both the LTE wireless network and on the CDMA 2000 1x wireless network and can therefore form connections with each wireless network singly but not simultaneously. The single radio wireless communication device can be connected on the LTE wireless network and can interrupt the connection to the LTE wireless network to communicate with the CDMA 2000 1x wireless network, e.g., to listen for pages, to measure signals, to provide location updates, or to establish a connection with the CDMA 2000 1× wireless network. During the interrupted LTE connection, control signaling and data transmissions between the wireless communication device and the wireless access network portion of the LTE wireless network can be interrupted. Packet transmissions and/or signaling messages from the LTE wireless network to the single radio wireless communication device can be dropped. For sufficiently long interruptions, the LTE wireless network can drop a connection with the single radio wireless communication device.

This application describes methods by which a single radio wireless communication device can be configured to operate in a multiple wireless network environment with simultaneous reception of signals from two different wireless networks.

SUMMARY

Broadly speaking, the described embodiments generally relate to methods and apparatuses for managing connections between wireless communication devices and wireless networks. More particularly, the present embodiments describe configuring wireless circuitry in a single radio wireless communication device to receive signals from a Long Term Evolution (LTE) wireless network and a legacy third generation (3G) wireless network singly or simultaneously based on operating conditions and requirements.

Methods and apparatuses to configure wireless circuitry in a wireless communication device, such as a single radio wireless communication device, are described herein. Representative methods include one or more of the following performed by the wireless communication device. The wireless communication device establishes a connection to a first wireless network using a first radio frequency signaling chain and a second radio frequency signaling chain. The first wireless network operates in accordance with a first wireless communication protocol. The wireless communication device obtains a configuration processing delay time for the first wireless network, such as from a network-based entity, from a server, from a local storage medium in and/or associated with the wireless communication device, and/or by estimating a value for the configuration processing delay time for the first wireless network. The wireless communication device transmits a first indicator, such as a channel status report including a rank indication value of one, to the first wireless network before initiating a tune-away event. The wireless communication device transmits the first indicator at a first time based at least in part on the configuration processing delay time. The wireless communication device subsequently reconfigures at least one of the first radio frequency signaling chain and the second radio frequency signaling chain to communicate with a second wireless network during the tune-away event. Before completing the tune-away event, the wireless communication device transmits a second indicator, such as a second channel status report including a rank indication value equal to or greater than one, to the first wireless network. The wireless communication device transmits the second channel status report to the first wireless network at a second time based at least in part on the configuration processing delay time. The wireless communication device subsequently reconfigures the at least one of the first radio frequency signaling chains to communicate with the first wireless network. In some embodiments, the first wireless network operates in accordance with a long term evolution (LTE) or long term evolution advanced (LTE-A) wireless communication protocol, and the second wireless network operates in accordance with a legacy third generation (3G) wireless communication protocol. In an embodiment, the legacy 3G wireless network operates in accordance with a CDMA 2000 1× (or EV-DO) wireless communication protocol, a UMTS wireless communication protocol, or a GSM wireless communication protocol.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings.

DETAILED DESCRIPTION

Figure 1:
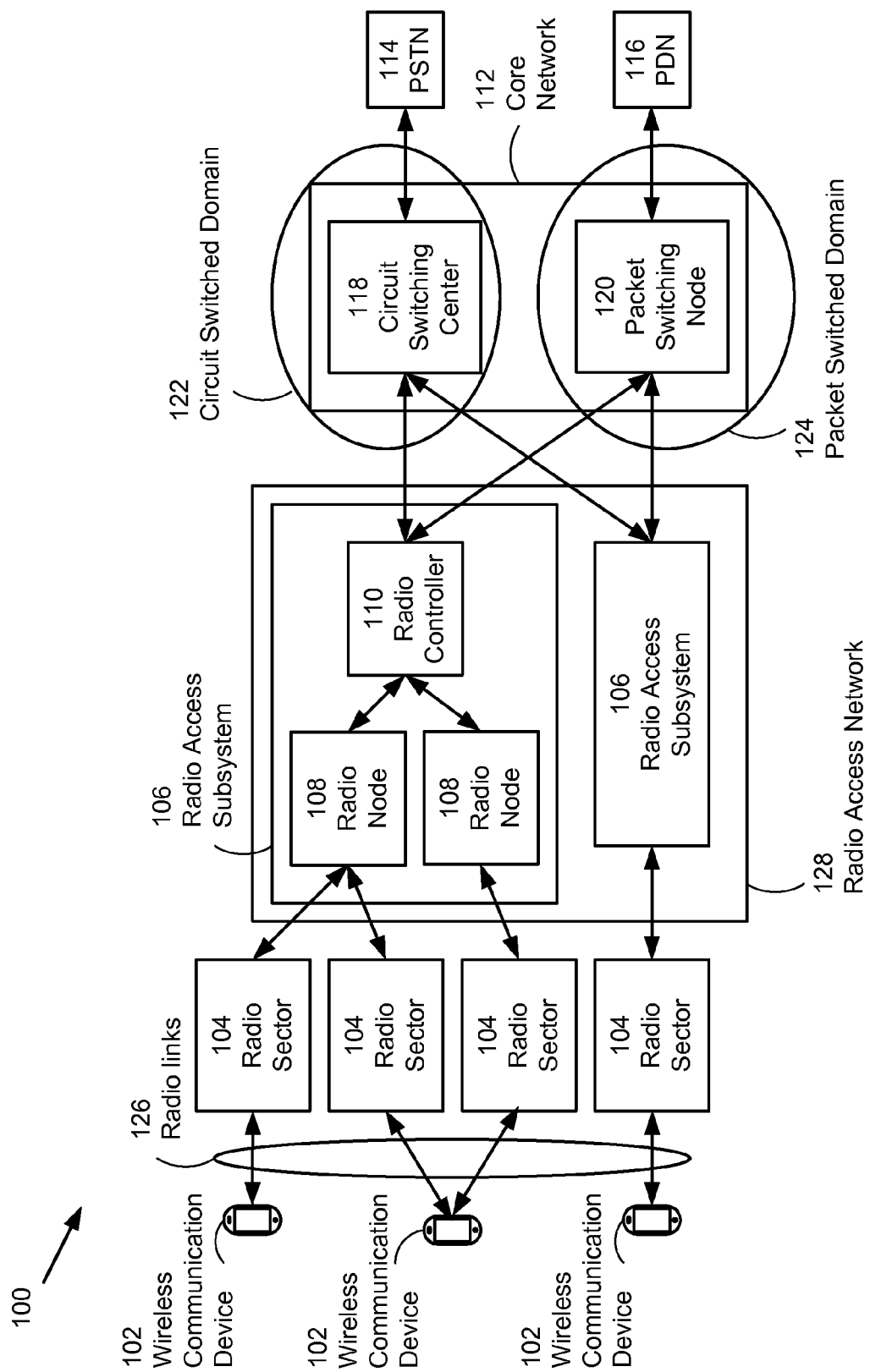
FIG. 1 illustrates components of a generic wireless communication network in accordance with some embodiments.

Wireless networks continue to evolve as network operators deploy equipment for new wireless communication technologies based on ongoing standardization efforts. Wireless communication devices can provide capabilities to communicate with wireless networks based on two or more different wireless communication technologies, e.g. GSM and LTE/LTE-A, UMTS and LTE/LTE-A, or CDMA 2000 1× and LTE/LTE-A, as newer wireless network technologies offer advanced capabilities in parallel with earlier wireless network technologies that can provide greater geographic area coverage and/or different wireless service implementations. Each wireless communication technology can require different hardware and/or software processing to transmit and receive wireless signals, and a wireless communication device can include multiple, separate signal processing chips to encode and decode wireless signals according to the different wireless communication technologies, particularly for two different cellular wireless networks. A dual radio wireless communication device, for example, can include a set of wireless circuitry for communication with a CDMA 2000 1× wireless network and a second set of wireless circuitry for communication with an LTE/LTE-A wireless network. With sufficient parallel analog hardware, the dual radio wireless communication device can communicate with either wireless network independently or with both of the wireless networks simultaneously. Dual radio wireless communication devices, however, can be more complex, larger, more costly and more power intensive than single radio wireless communication devices. In some embodiments, a single radio wireless communication device can provide a simpler, smaller, more cost effective and more power efficient wireless communication device than a dual radio wireless communication device. The single radio wireless communication device can communicate bi-directionally with one wireless network at a time out of multiple wireless networks and can provide limited simultaneous communication capabilities for a set of parallel wireless networks.

A dual network single radio wireless communication device that includes support for both CDMA 2000 1× and LTE is described as a representative device herein. The same teachings, however, can be applied to other wireless communication devices that can operate in dual (or more generally multiple) wireless communication technology networks with configurable hardware/software. In particular, the teachings disclosed herein can pertain to wireless communication devices that switch portions of wireless circuitry from one wireless technology to another wireless technology and back again, and which can be configured to receive communication from two different cellular wireless networks simultaneously. In some embodiments, the dual network single radio wireless communication device includes support for the two different wireless networks using wireless circuitry that includes a single radio configurable to operate with each of the two wireless networks. The wireless communication device can be configured to communicate bi-directionally with one wireless network while receiving and/or measuring signals from another wireless network simultaneously.

It should be understood that implementations of the same methods and apparatuses described herein can apply to wireless communication devices that operate in different types of wireless networks, particularly one or more wireless cellular networks that offer connections using two or more different generations or types of wireless communication protocols. For example, the same teachings can be applied to a wireless communication device configured to operate with a combination of LTE and GSM networks, LTE and UMTS networks, LTE and CDMA 2000 1× networks or other "combined" multiple radio access technology (multi-RAT) wireless networks. A specific example and implementation described herein in relation to CDMA 2000 1×-RTT and LTE wireless networks is presented for simplicity, but the methods and apparatuses disclosed herein can also apply equally to other wireless network environments that use other combinations of wireless access communication protocols. The methods and apparatuses described herein can apply to wireless communication devices in which a connection to a first wireless network is interrupted to support communication with a second wireless network and then later resumed. Interruption of the connection between the wireless communication device and the first wireless network can occur when the wireless communication device configures one or more receivers to operate on the second wireless network, e.g., to listen for signaling messages from the second wireless network, thereby interrupting a connection to the first wireless network.

In some embodiments described herein, a single radio wireless communication device can be capable of transmitting and receiving wireless radio frequency signals from an LTE wireless network or from a CDMA 2000 1× wireless network individually but not able to transmit and receive simultaneously with both wireless networks simultaneously. In some embodiments, the single radio wireless communication device can be configured to receive radio frequency signals from the LTE wireless network and from the CDMA 2000 1× wireless network simultaneously, while being able to transmit radio frequency signals with only one of the wireless networks. Initially, the single radio wireless communication device can be associated with the LTE wireless network, e.g. connected to or camped on the LTE wireless network. The single radio wireless communication device can be registered simultaneously with both the LTE wireless network and with the CDMA 2000 1× wireless network, and thus can be configured to establish connections with either the LTE wireless network or with the CDMA 2000 1× wireless network. In some embodiments, a set of services, e.g., circuit-switched voice connections, can be provided by the CDMA 2000 1× wireless network and can be not available through the LTE wireless network, which can offer packet-switched services only. The single radio wireless communication device can interrupt a packet-switched data connection with the LTE wireless network in order to communicate with and/or receive signals from the CDMA 2000 1× wireless network, e.g., to register initially with the CDMA 2000 1× wireless network, to listen for a page addressed to the wireless communication device for a mobile terminating circuit-switched voice connection to the CDMA 2000 1× wireless network, to establish a mobile originating circuit-switched connection with the CDMA 2000 1× wireless network, to provide a location area update message to maintain registration with the CDMA 2000 1× wireless network, to measure a serving cell and/or neighbor cells of the CDMA 2000 1× wireless network, or to implement all or part of an out-of-service procedure for the CDMA 2000 1× wireless network. Some actions that the wireless communication device takes on the CDMA 2000 1× wireless network can occur periodically, e.g., monitoring pages, searching for cells, and measuring cells of various available wireless network. Other actions can occur asynchronously or "on demand", e.g., responding to a mobile originating voice connection, responding to a mobile terminating page message, and providing a location area update. The duration of different events can vary substantially, e.g., from tens of milliseconds to several seconds to minutes or longer (e.g., for a voice connection). The single radio wireless communication device can suspend a packet-switched data connection with the LTE wireless network in order to communicate with and/or listen to the CDMA 2000 1× wireless network. Depending on the length of time of the interruption, the LTE wireless network can "recover" from a suspended connection or can "drop" the connection with the wireless communication device after an inactivity time out period.

In some embodiments, the LTE wireless network can be unaware that the wireless communication device suspended communication and can observe a gap in communication between the LTE wireless network and the wireless communication device. The single radio wireless communication device can configure radio frequency (RF) wireless circuitry contained in the single radio wireless communication device to "tune away" away from the LTE wireless network and "tune to" the CDMA 2000 1× wireless network to receive signals from and/or transmit signals to the CDMA 2000 1× wireless network. The single radio wireless communication device can subsequently re-configure the RF wireless circuitry to "tune back" to the LTE wireless network. Interruption of a packet-switched data connection (and of a parallel higher layer signaling connection) between the wireless communication device and the LTE wireless network can be accommodated without the LTE wireless connection being dropped in some circumstances, e.g., when the interruption is shorter than one or more inactivity timer expiration limits or other timer limits that would precipitate dropping the connection between the LTE wireless network and the single radio wireless communication device. Active data transfer between the LTE wireless network and the single radio wireless communication device as well as signaling messages communication from the LTE wireless network the wireless communication device during the suspension period can be interrupted and later resumed when the wireless communication device returns to the LTE wireless network.

Tune-away events in which the single radio wireless communication device completely tunes all transmitters and receivers from the LTE wireless network to the CDMA 2000 1× wireless network can negatively impact performance in some circumstances when returning to the LTE wireless network. During the tune-away event, signaling messages or data in the downlink direction from the LTE wireless network can be lost, and the single radio wireless communication device can also not provide acknowledgements, status reports, or other uplink signaling messages expected by the LTE wireless network. The LTE wireless network can allocate an uplink grant scheduled for the tune-away time period, and the single radio wireless communication device can be unable to use the uplink grant, as the transmitter can be tuned to the CDMA 2000 1× wireless network, thus wasting network radio frequency resources. In the absence of hybrid automatic repeat request (HARD) acknowledgement (ACK) and negative acknowledgement (NACK) messages and without knowledge of the tune-away event, the LTE wireless network can unnecessarily retransmit data in the downlink direction to the single radio wireless communication device during the tune-away event. Without receiving channel status reports that can provide channel quality indicators, rank indicators, and pre-coder matrix indicators, the LTE wireless network can determine "stale" channel downlink indicators that can be used for downlink scheduling. Similarly, during the tune-away event, without receiving a sounding reference signal from the single radio wireless communication device, the LTE wireless network can determine incorrect channel uplink conditions that can influence uplink scheduling. With a sufficiently long tune-away event, a radio resource control (RRC) inactivity timer at a network element of the LTE wireless network can expire, and the LTE wireless network can transition to an RRC idle state, while the single radio wireless communication device can expect to return in an RRC connected state when the tune-away event ends. This can result in errant mis-synchronization of states between the LTE wireless network and the single radio wireless communication device.

For certain tune-away events, a transmit path associated with a transmit signal chain or a set of transmit processing elements can continue to be used with the LTE wireless network, e.g., when monitoring pages from the CDMA 2000 1× wireless network or when searching for and measuring wireless network cells. The wireless communication device can monitor the pages using one or more receive signal chains or a set of receive processing elements, and when no page is received, can tune back to the LTE wireless network. During the interruption, it can be advantageous, if only listening and not requiring use of the transmitter by the CDMA 2000 1× wireless network, to continue to use all or portions of the transmitter on the LTE wireless network. Similarly, when reception on the CDMA 2000 1× wireless network by the single radio wireless communication device does not require use of multiple receivers, it can be advantageous to use only one receiver to listen on the CDMA 2000 1× wireless network and retain one receiver to listen on the LTE wireless network.

In some embodiments, the single radio wireless communication device can include wireless circuitry that can be configured for one of four different operating modes. The wireless circuitry can include a transmitter (TX) and a first receiver (RX0) that can each be tuned to a different carrier frequency, e.g., using separate voltage controlled crystal oscillators (VCXOs), which can referred to as a TX-VCXO, and an RX0-VCXO, and a second receiver (RX1) that can be tuned to the same carrier frequency as the first receiver RX0 using the RX0-VCXO or to a different carrier frequency, e.g., using a second receive VCXO, which can be referred as an RX1-VCXO. In a default operating configuration, which can be referred to as "mode 1" herein, the single radio wireless communication device can be configured to communicate with an LTE wireless network using the transmitter TX and both receivers RX0 and RX1. In some embodiments, an LTE wireless communication protocol can require that the wireless communication device support a dual receiver capability to provide a set of high downlink (DL) data rate transfers in a multiple input multiple output (MIMO) mode and/or for DL transmit diversity. In mode 1, the single radio wireless communication device can be unable to communicate with (transmit to and/or receive from) a second wireless network, e.g., a legacy CDMA 2000 1× wireless network as all of the wireless circuitry can be configured to support communication to and from the LTE wireless network. The single radio wireless communication device, however, can be registered with the CDMA 2000 1× wireless network and can reconfigure itself to listen for pages (e.g., for incoming MT voice connections) or to otherwise listen and/or transmit to the CDMA 2000 1× wireless network using additional configuration modes.

In some embodiments, in a second configuration, which can be referred to herein as "mode 4," the single radio wireless communication device can be configured to communicate with the second wireless network, e.g., the CDMA 2000 1× wireless network, using the transmitter TX and both receivers RX0 and RX1, providing a transmit path and a receive diversity path for communication with the CDMA 2000 1× wireless network. By configuring the single radio wireless communication device to use mode 1 or mode 4, the transmitter TX and both receivers RX0 and RX1 of the single radio wireless communication device can be dedicated to communicate bi-directionally with either the LTE wireless network or with the CDMA 2000 1× wireless network. With the inclusion of an independent frequency control, e.g., the RX1-VCXO, however, the single radio wireless communication device can also be configured to allocate one receiver to each wireless network, thereby permitting reception of signals from a second wireless network in parallel with communication to and/or from a first wireless network, as described further herein.

In an embodiment, the single radio wireless communication device can be configured to a third configuration, which can be referred to herein as "mode 2," to use the transmitter TX (using the TX-VCXO) and the first receiver RX0 (using the RX0-VCXO) in combination to communicate bi-directionally with the LTE wireless network and to use the second receiver RX1 (using the RX1-VCXO) to listen for signaling messages and/or to measure signals received from the CDMA 2000 1× wireless network (or from one or more other wireless networks). In mode 2, the single radio wireless communication device can be able to maintain full communication with the LTE wireless network, without the highest data rate MIMO downlink configurations that can require multiple receivers simultaneously tuned to the LTE wireless network, while also listening for signaling messages, e.g., pages, from the CDMA 2000 1× wireless network and/or measuring cell strength or quality for a serving cell and/or neighbor cells of the CDMA 2000 1× wireless network. In mode 2, in some embodiments, the single radio wireless communication device can also measure signals from wireless networks using "other" radio access technologies, e.g., for inter-radio access technology (iRAT) measurements, e.g., by tuning the second receiver RX1 (using the RX1-VCXO) to another frequency used by a wireless network operating an alternative radio access technology. Mode 2 can prove useful for monitoring the CDMA 2000 1× wireless network during a wake time period of a discontinuous receive (DRX) cycle and for measuring cells for cell selection and/or reselection for non-LTE wireless networks.

In some embodiments, the single radio wireless communication device can be configured to a fourth configuration, which can be referred to herein as "mode 3," to use the transmitter TX and the first receiver RX0 (using the RX0-VCXO) in combination to communicate with the CDMA 2000 1× wireless network and to use the second receiver RX1 (using the RX1-VCXO) to listen for signaling messages and/or to measure signals from the LTE wireless network (or from one or more other wireless networks). In mode 3, the single radio wireless communication device can be able to communicate with the CDMA 2000 1× wireless network, while listening for messages or measuring signals from the LTE wireless network. Mode 3 can be used when bi-directional communication with the CDMA 2000 1× wireless network does not require the use of both receivers as provided for in mode 4; thus receive diversity is not provided in mode 3, but under "good" signal operating conditions, receive diversity may not be required for communication with the CDMA 2000 1× wireless network. Mode 3 can be used for a connection with the CDMA 2000 1× wireless network, e.g., a circuit-switched voice connection in a CSFB procedure, while simultaneously receiving signaling messages and/or measuring cells of the LTE wireless network in parallel.

The single radio wireless communication device can determine in which mode to operate based on requirements for communication with and/or monitoring of signals with one or more parallel wireless networks. In some embodiments, the single radio wireless communication device can determine whether a set of receive signal conditions is satisfied when determining in which mode to operate, e.g., when "good" signal conditions prevail and reception from two wireless networks is preferred, the wireless communication device can operate in a mode that assigns a first receiver to a first wireless network and a second receiver to a second wireless network, and when "poor" signal conditions exist, the single radio wireless communication device can operate in a mode that assigns both the first and second receivers to either the first or second wireless network, depending on a requirement for use and a prioritization of use for the wireless networks.

Certain tune-away events can be scheduled to occur at regular intervals, e.g., listening for paging messages on a second wireless network, e.g., a CDMA 2000 and can extend for a short period of time, e.g., when good signal conditions prevail and paging messages can be received correctly. For tune-away events that occur with good signal receive signal conditions at the single radio wireless communication device, during which a single receiver (or equivalently a single receive radio frequency signal chain) can suffice and a transmitter (or equivalently a transmit signal chain) is not required for use on the second wireless network, the single radio wireless communication device can provide updated indicators in channel status reports before the tune-away event to the first wireless network. The single radio wireless communication device can continue to communicate bi-directionally with the LTE wireless network during a tune-away event in which one receiver is provided for reception of signals from the CDMA 2000 1× wireless network. In some embodiments, the single radio wireless communication device can determine and provided updated channel status reports to the LTE wireless network before and/or during tune-away events for one or more different operating modes as described further herein. Information provided in the channel status reports can be adjusted to account for use of only one receiver at the single radio wireless communication device during a tune-away event, rather than two receivers used in parallel for receiving MIMO communication and/or for processing received signals using receive diversity for downlink transmissions. The single radio wireless communication device can provide in a channel status report to the LTE wireless network a rank indicator value of one (rather than a higher rank indicator value) before the tune-away event. The single radio wireless communication device can also determine an adjusted channel quality indicator (CQI) value based on the use of one receiver rather than the use of multiple receivers, which can occur during the tune-away event. In some embodiments, a "single receiver" SINR value can be determined using a "dual receiver" SINR value and additional channel characteristic and encoding information. The single radio wireless communication device can report a CQI value that corresponds to the determined "single receiver" SINR value. In some embodiments, the single radio wireless communication device can obtain a value for a configuration processing delay period during which the LTE wireless network processes CQI, RI, or other CSR values reported by the single radio wireless communication device. In some embodiments, the LTE wireless network provides the value for the configuration processing delay period of the LTE wireless network. In some embodiments, the single radio wireless communication device estimates a value for the configuration processing delay period of a wireless network to which it is in communication, e.g., the LTE wireless network. The single radio wireless communication device can report "single receiver" CQI and/or RI values to the LTE wireless network before the start of a tune-away event by at least the obtained configuration processing time delay value and can report "double receiver" CQI and/or RI values to the LTE wireless network (when a transmitter is available) before the end of the tune-away event.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks. The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

FIG. 1 illustrates a representative "generic" wireless network 100 that can include multiple wireless communication devices 102 connected by radio links 126 to radio sectors 104 provided by a radio access network 128. Each radio sector 104 can represent a geographic area of radio coverage emanating from an associated radio node 108 using a radio frequency channel operating at a selected frequency. Each radio node 108 can generate one or more radio sectors 104 to which the wireless communication device 102 can connect by one or more radio links 126. In some wireless networks 100, the wireless communication device 102 can be connected to more than one radio sector 104 simultaneously. The multiple radio sectors 104 to which the wireless communication device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the wireless communication device 102 to the radio access network 128.

Radio resources that form the radio links 126 in the radio sectors 104 can be shared among multiple wireless communication devices 102 using a number of different multiplexing techniques, including time division, frequency division, code division, space division and combinations thereof. A radio resource control (RRC) signaling connection can be used to communicate between the wireless communication device 102 and the radio controller 110 in the radio access subsystem 106 of the radio access network 128 including requests for and dynamic allocations of radio resources to multiple wireless communication devices 102. Suspension of allocations of radio resources to a wireless communication device 102 can occur without dis-establishing the radio resource signaling connection to the wireless communication device 102.

The radio access network 128, which provides radio frequency air link connections to the wireless communication device 102, connects also to a core network 112 that can include a circuit-switched domain 122, usually used for voice traffic, and a packet-switched domain 124, usually used for data traffic. Radio controllers 110 in the radio access subsystems 106 of the radio access network 128 can connect to both a circuit-switching center 118 in the circuit-switched domain 122 and a packet-switching node 120 in the packet-switched domain of the core network 112. The circuit-switching center 118 can route circuit-switched traffic, such as a voice call, to a public switched telephone network (PSTN) 114. The packet-switching node 120 can route packet-switched traffic, such as a "connectionless" set of data packets, to a public data network (PDN) 116.

Figure 2:
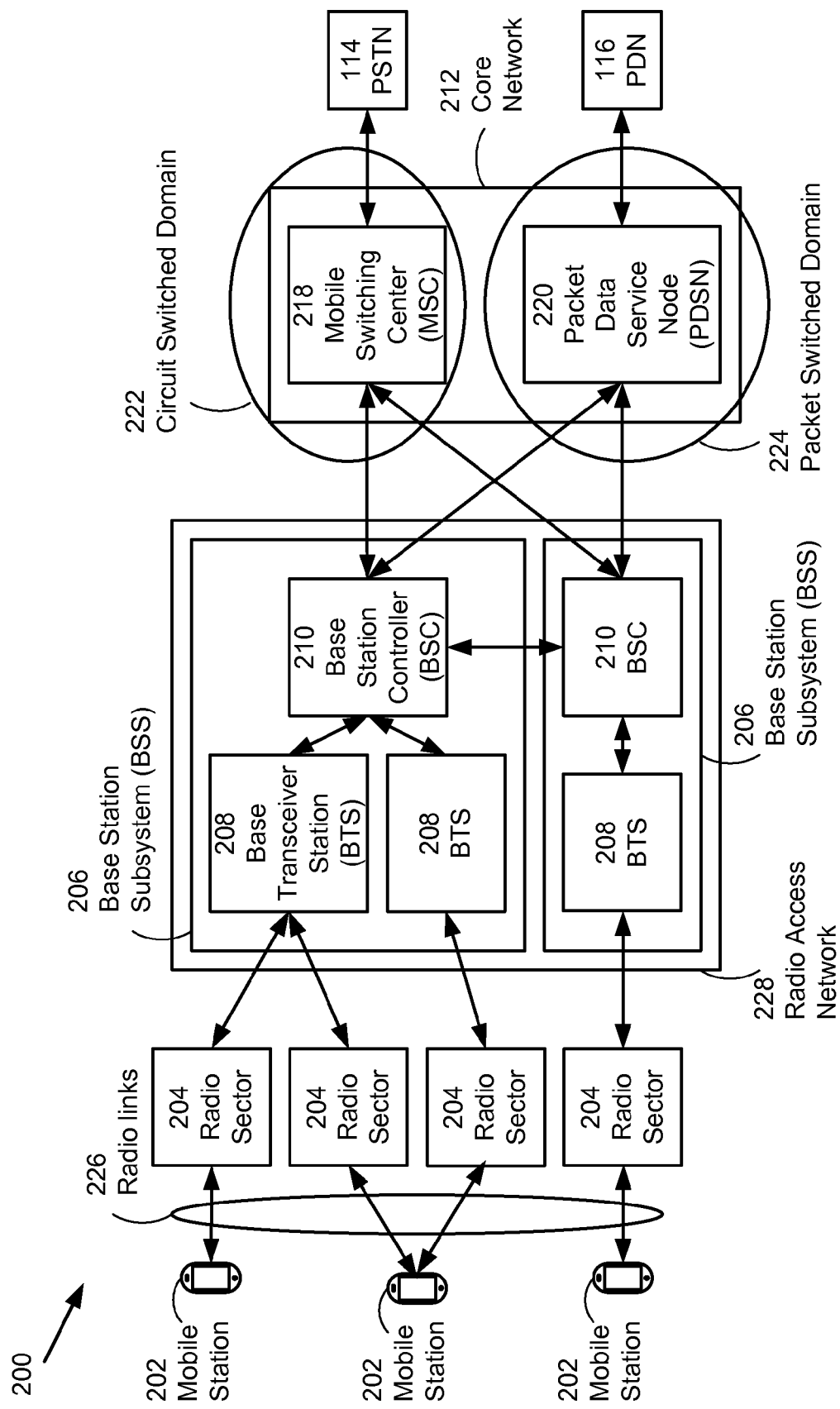
FIG. 2 illustrates components of a CDMA 2000 1× (RTT or EV-DO) wireless communication network in accordance with some embodiments.

FIG. 2 illustrates a representative CDMA 2000 1× wireless network 200 that can include elements comparable to those described for the "generic" wireless network 100 shown in FIG. 1. Multiple mobile stations 202 can connect to one or more radio sectors 204 through radio frequency links 226. Each radio sector 204 can radiate outward from a base transceiver station (BTS) 208 that can connect to a base station controller (BSC) 210, together forming a base station subsystem (BSS) 206. Multiple base station subsystems 206 can be aggregated to form a radio access network 228. Base station controllers 210 in different base station subsystems 206 can be interconnected. The base station controllers 210 can connect to both a circuit-switched domain 222 that use multiple mobile switching centers (MSC) 218 and a packet-switched domain 224 formed with packet data service nodes (PDSN) 220, which together can form a core network 212 for the wireless network 200. As with the generic wireless network 100 described above, the circuit-switched domain 222 of the core network 212 can interconnect to the PSTN 114, while the packet-switched domain 224 of the core network 212 can interconnect to the PDN 116. Establishing connections on the CDMA 2000 1× wireless network 200 can depend on the mobile station 202 receiving a page from the BSS 206 indicating an incoming connection. The mobile station 202 can be required to listen for pages during specific paging intervals. Without reception of the page, the mobile station 202 can be unaware of a request to form a connection between the mobile station 202 and the CDMA 2000 1× wireless network 200. In some embodiments, the mobile station 202 can operate in a discontinuous receive (DRX) mode with respect to the CDMA 2000 1× wireless network 200, e.g., "sleeping" during certain time periods and "waking" during short intervals to listen for paging messages. As the wireless circuitry that supports transmission and reception of radio frequency signals can be not required during the "sleep" time periods, the mobile station 202 can reconfigure wireless circuitry for use on another wireless network during those time periods. During the "wake" time period, the mobile station 202 can configure a portion of the wireless circuitry to listen for paging messages and also to measure receive signals from a serving cell and/or neighbor cells. In some embodiments, the mobile station 202 can configure another portion of the wireless circuitry to remain connected to (transmit and receive) or listen for and/or measure (receive only) signals from another network, while also receiving paging messages on the CDMA 2000 1× wireless network 200.

Figure 3:
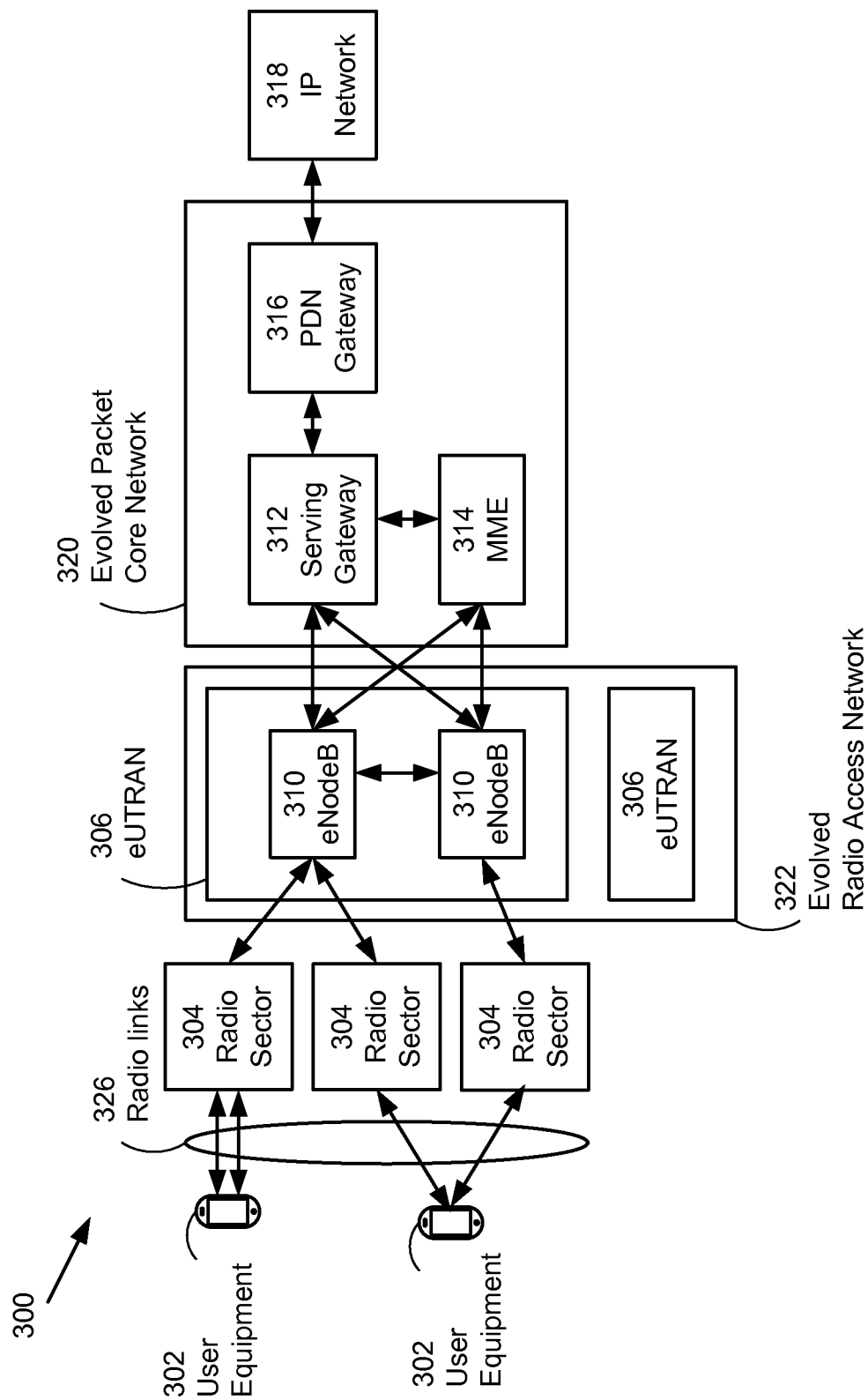
FIG. 3 illustrates components of an LTE (or LTE-Advanced) wireless communication network in accordance with some embodiments.

FIG. 3 illustrates a representative Long Term Evolution (LTE) wireless network 300 architecture designed as a packet-switched network exclusively. A user equipment 302 can connect to an evolved radio access network 322 through radio links 326 associated with radio sectors 304 that emanate from evolved Node B's (eNodeB) 310. The eNodeB 310 can include the functions of both transmitting and receiving base stations (such as the BTS 208 in the CDMA 2000 1× wireless network 200) as well as base station radio controllers (such as the BSC 210 in the CDMA 2000 1× wireless network 200). The equivalent core network of the LTE wireless network 300 is an evolved packet core network 320 including serving gateways 312 that interconnect the evolved radio access network 322 to public data network (PDN) gateways 316 that connect to external internet protocol (IP) networks 318. Multiple eNodeB 310 can be grouped together to form an eUTRAN 306. The eNodeB 310 can also be connected to a mobility management entity (MME) 314 that can provide control over connections for the user equipment 302. The eNodeB 310 can control allocation of radio resources for the radio links 326 to the user equipment 302. The eNodeB 310 can communicate paging messages to the user equipment 302, including paging messages to establish an RRC connection with the user equipment 302 and transition from an RRC idle state to an RRC connected state. The user equipment 302 can be required to be in an RRC connected state in order to communicate application data packets and signaling messages. The user equipment 302 can communicate information to the eNodeB 310 that is used by the LTE wireless network 300 to determine downlink and uplink resource scheduling. The user equipment 302 can provide information in the form of channel status reports that can include channel quality indicators, rank indicators, and precoding matrix indicators. The eNodeB 310 can determine downlink transmission parameters, e.g., the use of MIMO transmissions, based at least in part on the reported values in the channel status reports provided by the user equipment 302.

Figure 4:
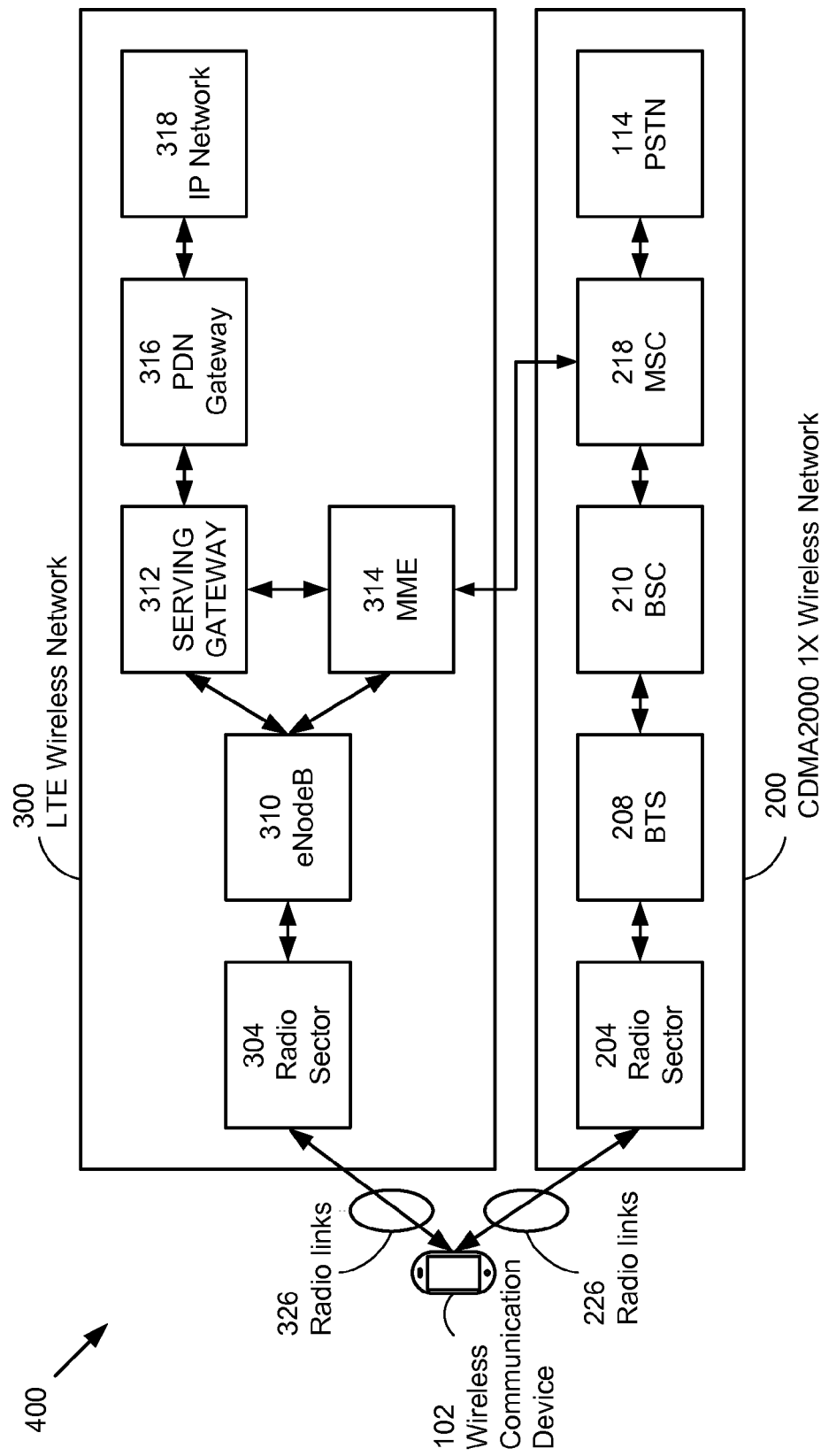
FIG. 4 illustrates a wireless communication device connected in parallel with the CDMA 2000 1× (RTT or EV-DO) wireless communication network of FIG. 2 and with the LTE (or LTE-Advanced) wireless communication network of FIG. 4 in accordance with some embodiments.

FIG. 4 illustrates a wireless communication device 102 in communication with both the LTE wireless network 300 and with the CDMA 2000 1× wireless network 200. (The generic term "wireless communication device" 102 shall be used hereinafter to denote a mobile terminal, a mobile station, a user equipment, or other comparable recognized term for a mobile wireless device that can connect through a wireless access network to one or more wireless networks.) The CDMA 2000 1× wireless network 200 can connect to the circuit switch based public switched telephone network (PSTN) 114 through a mobile switching center (MSC) 218. The CDMA 2000 1× wireless network 200 can provide circuit-switched services, e.g., circuit-switched voice connections for the wireless communication device 102, such as used in a circuit-switched fallback (CSFB) procedure. The MSC 218 of the CDMA 2000 1× wireless network 200 can be interconnected to the MME 314 of the LTE wireless network 300 to coordinate call signaling for the wireless communication device 102. In some embodiments, the CDMA 2000 1× wireless network 200 can seek to establish a connection through the radio links 226 with the wireless communication device 102, e.g. to establish a voice connection between the wireless communication device 102 and the PSTN 114. The CDMA 2000 1× wireless network 200 can transmit a page message to the wireless communication device 102 using the radio links 226 to indicate the availability of an incoming voice connection. Unless a receiver in the wireless communication device 102 is tuned to listen for the page message from the CDMA 2000 1× wireless network 200 during the appropriate paging interval, the wireless communication device 102 can be connected to the LTE wireless network 300 during the paging interval and can be unaware of an attempt to form a mobile terminated voice connection. A single radio wireless communication device 102 can be configured to communicate (transmit and receive) radio frequency signals with only one wireless network at a time. In some embodiments, the single radio wireless communication device 102 can be configured to communicate with one wireless network while simultaneously listening/measuring to one or more other wireless networks, as described further herein. The single radio wireless communication device 102 can be normally configured to communicate with the LTE wireless network 300 and to listen periodically for page messages from the CDMA 2000 1× wireless network 200 by tuning a receiver in the single radio wireless communication device 102 from the LTE wireless network 300 to the CDMA 2000 1× wireless network 200 temporarily and subsequently re-tuning the receiver back to the LTE wireless network 300. In order to receive signaling messages and/or data packets from the LTE wireless network 300 the single radio wireless communication device 102 can listen for paging messages from the CDMA 2000 1× wireless network 200 using one receiver and can maintain another receiver tuned to the LTE wireless network 300. In some embodiments, the single radio wireless communication device 102 initially tunes one receiver to the CDMA 2000 1× wireless network 200 during the tune-away event and subsequently in response to receiving a page indication for a mobile terminated voice connection tunes a transmitter to the CDMA 2000 1× wireless network 200 to establish the voice connection with the CDMA 2000 1× wireless network 200. The single radio wireless communication device 102 can provide channel status reports before and/or during a tune-away event to the LTE wireless network 300 to request that downlink transmissions match the capabilities available for the LTE wireless network 300 during the tune-away event. When the single radio wireless communication device 102 determines to keep at least one receiver available to receive transmissions in the downlink direction from the LTE wireless network 300 during the tune-away event, the single radio wireless communication device 102 can send one or more channel status reports that indicate values directly or indirectly for using a single receiver at the single radio wireless communication device 102 during the tune-away event. The single radio wireless communication device 102 can subsequently provide channel status reports to the LTE wireless network 300 that correspond to using multiple receivers for a time period that follows the tune-away event. In some embodiments, the single radio wireless communication device 102 determines a "delay" time period that the LTE wireless network incurs to process the channel status reports and sends the channel status reports at least the determined "delay" time period value before the start and/or the end of a tune-away event. By sending the channel status reports in advance of a change from to/from the LTE wireless network 300, the single radio wireless communication device 102 can seek to minimize times when the LTE wireless network 300 downlink transmissions and the reception capability of the wireless communication device 102 to receive them are mismatched.

Figure 5:
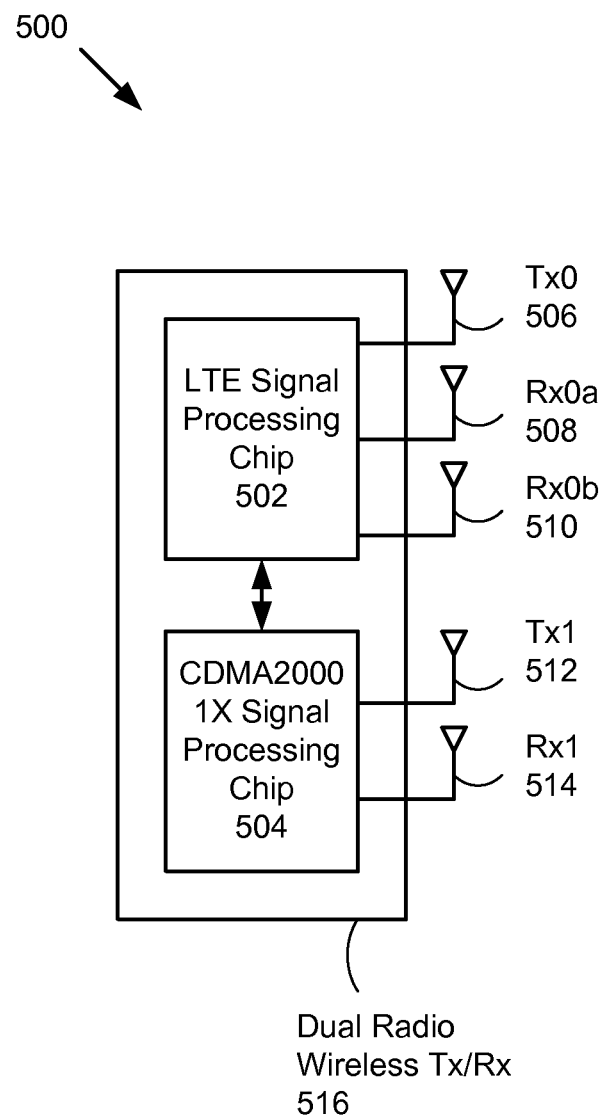
FIG. 5 illustrates elements of a wireless communication device including multiple wireless signal processing chips in accordance with some embodiments.

FIG. 5 illustrates select wireless signal processing elements 500 that can be contained in a dual radio wireless transmitter/receiver (TX/RX) 516 of a dual radio wireless communication device 102. An LTE signal processing chip 502 can be used to provide connections between the dual radio wireless communication device 102 and the LTE wireless network 300, while a CDMA 2000 1× signal processing chip 504 can be used to provide connections between the dual radio wireless communication device 102 and the CDMA 2000 1× wireless network 200. Each signal processing chip can be connected to a set of antennas (and other attendant wireless circuitry) through which radio frequency signals can be transmitted and received with respective wireless networks. The LTE signal processing chip 502 can be connected to a transmitting antenna 506 and to a pair of receive antennas 508/510. Multiple receive antennas can be used to improve performance through various forms of receive diversity and can be required based on a standardized wireless communication protocol. With the separate CDMA 2000 1× signal processing chip 504, the dual radio wireless communication device 102 can transmit and receive radio frequency signals with the CDMA 2000 1× wireless network 200 through a transmit antenna 512 and a receive antenna 514, while simultaneously transmitting and receiving radio frequency signals with the LTE wireless network 300 through the separate transmit antenna 506 and receive antennas 508/510. The LTE signal processing chip 502 and the CDMA 2000 1× signal processing chip 504 can be connected to each other in order to coordinate radio frequency signal communication with their respective wireless networks. The dual radio wireless transmitter/receiver 516, while flexible, can be more expensive, consume more power and occupy more space than a compact, low power single radio wireless transmitter/receiver, a representative embodiments of which is illustrated in FIG. 6.

Figure 6:
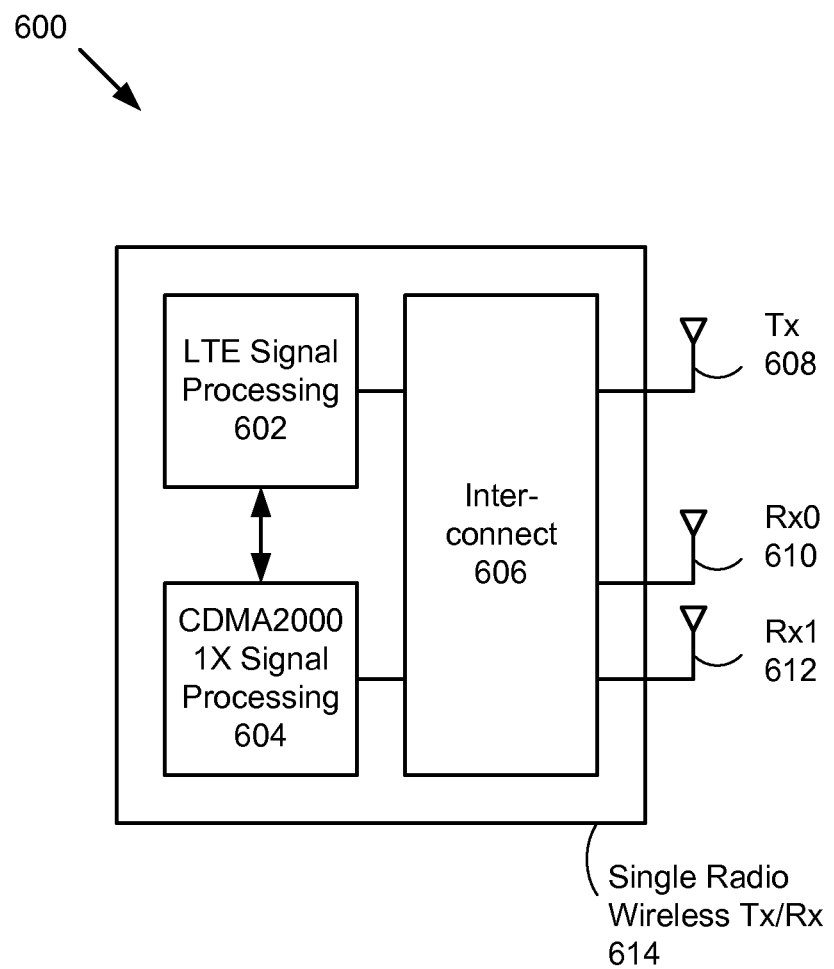
FIG. 6 illustrates elements of a representative wireless communication device that includes a single signal processing chip that supports multiple wireless networks in accordance with some embodiments.

FIG. 6 illustrates a single radio wireless transmitter/receiver 614 that can reside in a single radio wireless communication device 102 that can communicate (transmit and receive) with the LTE wireless network 300 or with the CDMA 2000 1× wireless network 200 separately but not simultaneously. When connected to the LTE wireless network 300, the single radio wireless communication device 102 can use a single transmitter (Tx) 608 and dual receivers (Rx) 610/612, e.g., to support receive diversity, or MIMO operation, or carrier aggregation on different frequencies. When connected to the CDMA 2000 1× wireless network 200, the single radio wireless communication device 102 can use the single transmitter 608 and either one receiver (Rx 610 or Rx 612) or both receivers (Rx 610 and Rx 612), e.g., for receive diversity. Use of dual receivers for both the LTE wireless network 300 and the CDMA 2000 1× wireless network 200 can provide higher receive signal quality and therefore higher data throughput and/or greater connection reliability under adverse signal conditions. In "good" signal conditions, however, use of both receivers can be not required, particularly when connected to or listening for signals from the CDMA 2000 1× wireless network 200. In some embodiments, the single radio wireless transmitter 614 can be configured to allow reception through a first receiver, e.g., Rx0 610, associated with a first wireless network, while also allowing reception through the second receiver, e.g., Rx1 612, associated with a second wireless network. An interconnect block 606 can be used to connect the LTE signal processing block 602 or the CDMA 2000 1× signal processing block 604 to the transmitter 608 and/or one or both of the receivers 610/612 respectively. Within the single radio wireless communication device 102, the single radio wireless transmitter/receiver 614 can be connected to an application processor (not shown) that can perform "higher layer" functions such as establishing connections for applications and forming messages to be communicated with various wireless networks, while the single radio wireless transmitter/receiver 614 can perform "lower layer" functions such as ensuring integrity of transmitted and received radio frequency signals that carry messages for the application processor.

Figure 7:
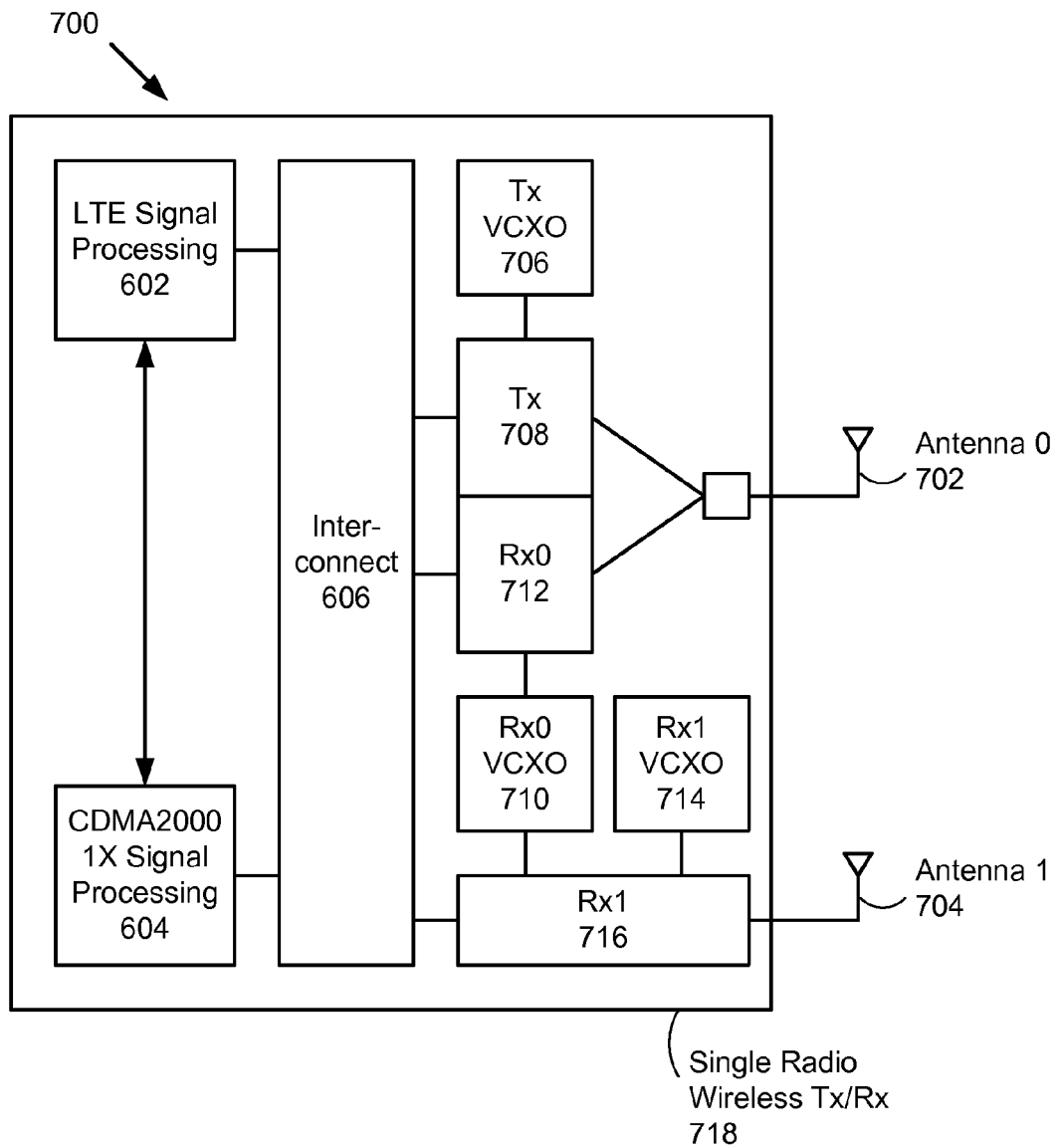
FIG. 7 illustrates another representative wireless communication device that includes a single signal processing chip that supports multiple wireless networks in accordance with some embodiments.

FIG. 7 illustrates another representative single radio wireless communication device 102 that includes a single radio wireless transmitter and receiver chip 718 that supports multiple wireless networks in accordance with some embodiments. The single radio wireless transmitter/receiver chip 718 can include a combination of hardware, firmware, and/or software to support wireless communication with multiple wireless networks that operate according to different wireless communication protocols. In an embodiment, the single radio wireless transmitter/receiver 718 includes an LTE signal processing block 602 and a CDMA 2000 1× signal processing block 604. An interconnect block 606 can provide connections between the LTE signal processing block 602 and a set of transmit and receive circuitry, e.g., amplifiers, digital to analog converters, analog to digital converters, filters, voltage controlled crystal oscillators (VCXOs), antennas, and other wireless circuitry that can support the transformation of digital packets into radio frequency analog waveforms and back into digital packets. In some embodiments, the LTE signal processing block 602 can be connected to a transmitter (Tx) 708 and first receiver (Rx0) 712, which can operate as a pair for transmission and reception of radio frequency signals in accordance with an LTE wireless communication protocol. The LTE signal processing block can also be connected to a second receiver (Rx1) 716, which can also operate in cooperation with the transmitter 708 and the first receiver (Rx0) 712 to provide dual receiver capability, e.g., as used in MIMO reception and with receiver diversity. The first and second receivers 712/716 can be connected to the same VCXO (Rx0) 710, which can be tuned to an LTE carrier frequency. The LTE signal processing block 602 can use the transmitter 708 and both receivers 712/716 in a "mode 1" as described hereinabove. In some embodiments, the LTE signal processing block 602 can support a wireless communication protocol that uses carrier aggregation to combine information transmitted on two or more carrier frequencies.

In some embodiments, the second receiver (Rx1) 716 can be connected to a second VCXO (Rx1) 714 that provides a carrier frequency different from the carrier frequency provided by the first VCXO (Rx0) 710. The first and second carrier frequencies can be in the same frequency band or in different frequency bands when using carrier aggregation for LTE wireless reception at high data rates. In some embodiments, the second VCXO (Rx1) 714 can be tuned to a carrier frequency for use of a "legacy" wireless communication protocol, e.g., a CDMA 2000 1× wireless communication protocol, a UMTS wireless communication protocol, or a GSM wireless communication protocol. In an embodiment, the CDMA 2000 1× signal processing block 604 can be connected through the interconnect 606 to the second receiver (Rx1) 716, which can be tuned to a separate carrier frequency for receiving signals (e.g., via antenna 704) in accordance with a CDMA 2000 1× wireless communication protocol from a CDMA 2000 1× wireless network 200. The LTE signal processing block 602 can be connected to the transmitter 708 and the first receiver (Rx0) 712, to transmit and receive signals with an LTE wireless network 300, e.g., via antenna 702, while the CDMA 2000 1× signal processing block 604 receives signals from a "non-LTE" wireless network in a "mode 2." With only one receiver allocated for LTE communication, the single radio wireless communication device 102 can be unable to receive MIMO transmissions. In some embodiments, when reconfiguring from "mode 1" to "mode 2," the single radio wireless communication device 102 can communicate with the LTE wireless network 300 to indicate a preference for "non-MIMO" downlink communication, e.g., by providing a rank indicator (RI) value of 1 in a channel status report (CSR) or by providing another signaling control message to the LTE wireless network 300. By using two separate receivers (Rx0 712 and Rx1 716) tuned to two separate carrier radio frequencies, the single radio wireless communication device 102 can maintain continuous bi-directional communication with the LTE wireless network 300 while listening for paging messages or receiving signals from another wireless network, e.g., CDMA 2000 1× wireless network 200. In some embodiments, the CDMA 2000 1× signal processing block 604 can be configured for a discontinuous receive (DRX) mode that periodically wakes from a "sleep" state and decodes the paging messages from the CDMA 2000 1× wireless network 200 and/or measures signals from a non-LTE wireless network.

In some embodiments, the transmitter 708 and the first receiver (Rx0) 712 can be tuned from the LTE wireless network 300 to a legacy wireless network, e.g., the CDMA 2000 1× wireless network 200, in order to provide communication (transmission and reception) with the legacy wireless network while retaining a reception capability with the LTE wireless network 300 using the second receiver (Rx1) 716. In an embodiment, the transmit (Tx) VCXO 706 and the first receive VCXO (Rx0) 710 can be tuned to carrier frequencies associated with the CDMA 2000 1× wireless network 200, e.g., in order to perform a circuit-switched fallback (CSFB) procedure to complete a mobile originated voice connection with the CDMA 2000 1× wireless network 200. The second VCXO (Rx1) 714 can remain tuned (or be retuned) to a carrier frequency associated with the LTE wireless network 300, while the transmitter and first receiver (Tx 708 and Rx0 712) are associated with wireless communication with the CDMA 2000 1× wireless network 200. Configuration of the single radio wireless communication device 102 in this "mode 3" operation and can provide the wireless communication device 102 with the capability to communicate fully with the CDMA 2000 1× wireless network 200 while continuing to receive signaling messages and/or measure radio frequency signals from the LTE wireless network 300 or from other parallel wireless networks. In some instances, communication with the CDMA 2000 1× wireless network 200 can be relatively short, e.g., providing a location area update or a short message service (SMS) communication, and communication with the LTE wireless network 300 can be restored by reconfiguring the wireless communication device 102 to the "mode 1" configuration relatively quickly. While communicating with the CDMA 2000 1× wireless network 200, the single radio wireless communication device 102 can continue to receive signaling messages from the LTE wireless network 300, e.g., on PDCCH and/or PDSCH channels, as signaling messages can be transmitted in the downlink direction from the LTE wireless network 300 using transmit diversity and can not require receive diversity or MIMO reception by the wireless communication device 102. The one receiver used in the "mode 3" configuration for receiving signals from the LTE wireless network 300 can suffice with receiving signaling messages. The wireless communication device 102 can also continue to receive layer ⅔ signaling messages (e.g., RRC messages) from the LTE wireless network 300 that are communicated using small packets that do not require MIMO transmission as can be used for large packets. By providing for reception of signaling messages from the LTE wireless network 300 while the wireless communication device 102 simultaneously communicates with the CDMA 2000 1× wireless network 200, the single radio wireless communication device 102 can be less likely to lose a connection with the LTE wireless network 300 and provide improved performance for a user of the wireless communication device 102. In some embodiments, the LTE signal processing block 602 can measure signals received through the second receiver 716 (Rx1) to determine cell characteristics (e.g., for a serving cell and/or for neighbor cells) to have better knowledge of performance when connecting and communicating with the LTE wireless network 300 (rather than encountering an unknown condition when returning from a configuration with no reception of signals from the LTE wireless network 300, e.g., when the transmitter 708 and both receivers 712/716 are allocated to a non-LTE wireless network, such as the CDMA 2000 1× wireless network 200). In some embodiments, the wireless communication device 102 can provide a mobile terminated or mobile originated voice connection with the CDMA 2000 1× wireless network 200 during which the wireless communication device 102 can operate the LTE signal processing block 602 in a discontinuous receive (DRX) mode, with intermittent reception of LTE signals and/or measurement of cells during "wake" time periods interspersed with "sleep" time periods.

In some embodiments, the wireless communication device 102 can determine a configuration in which to operate based on a measurement of signal strength, signal quality or other set of signal characteristics and metrics. When operating in an area with "good" signal coverage (with respect to the CDMA 2000 1× wireless network 200) and in response to a "tune away" event that requires use of at least one receiver for reception of signals from the CDMA 2000 1× wireless network 200, the wireless communication device 102 can operate in the "mode 3" configuration for a mobile originated voice connection, location area update, SMS communication, or other transmit/receive event with the CDMA 2000 1× wireless network 200, while retaining the second receiver (Rx1) 716 for use with the LTE wireless network 300. When operating in an area with "poor" signal coverage (with respect to the CDMA 2000 1× wireless network 200) and in response to the "tune away" event, the wireless communication device 102 can operate in the "mode 4" configuration that provides both receivers 712/716 and the transmitter 708 for communication with the CDMA 2000 1× wireless network 200. The wireless communication device 102 can opt for using receive diversity when operating in "poor" signal conditions to provide better reception of weak CDMA 2000 1× wireless signals or in the presence of high levels of noise and/or interference. The wireless communication device 102 can opt for using only a single receiver when operating in "good" signal conditions to permit continued reception of wireless signals from the LTE wireless network 300 while communicating simultaneously with the CDMA 2000 1× wireless network 200. In "good" signal conditions, the wireless communication device 102 can select "mode 2" when reception of signals from and no transmission of signals to the CDMA 2000 1× wireless network 200 is required. Full bi-directional communication (excepting MIMO reception) with the LTE wireless network 300 can continue while operating the single radio wireless communication device 102 in the "mode 2" configuration. In an instance when the CDMA2000 1× signal processing block 604 receives a paging message while in "mode 2" from the CDMA 2000 1× wireless network 200, e.g., indicating a mobile terminated connection, the wireless communication device 102 can be reconfigured to either "mode 3" or "mode 4" to provide bi-directional communication with the CDMA 2000 1× wireless network 200. The selection to use "mode 3" or "mode 4" for communication between the wireless communication device 102 and the CDMA 2000 1× wireless network 200 can depend on a set of signal conditions being satisfied, e.g., "good" signal coverage allowing for using one receiver with the LTE wireless network 300 and the other receiver with the CDMA 2000 1× wireless network 200, while "poor" signal coverage requiring use of both receivers for the CDMA 2000 1× wireless network 200. Upon completion of the "tune away" event, e.g., completion of the mobile originated or mobile terminated voice connection, completion of the location area update or SMS communication, the wireless communication device 102 can be reconfigured back to use of the LTE wireless network 300, e.g., in a "mode 1" configuration that permits full reception of signals from the LTE wireless network 300 including MIMO operation or in a "mode 2" configuration that uses only one receiver for reception of signals from the LTE wireless network 300 and retains the other receiver for signals received from the CDMA 2000 1× wireless network 200. In some embodiments, the wireless communication device 102 can monitor the PDCCH and/or PDSCH channels for information about a format for downlink transmissions from the LTE wireless network 300, which can indicate whether MIMO downlink transmission is being used, and the wireless communication device 102 can select an operational mode appropriately. If the wireless communication device 102 prefers to operate with one receiver assigned to each of two different wireless networks, the wireless communication device 102 can communicate a rank indication of 1 to the LTE wireless network 300, e.g., using the rank indicator portion of a channel status report message, to indicate a preference to not receive MIMO rank 2 (or higher rank) downlink transmissions. In an instance when the wireless communication device 102 is presently receiving MIMO downlink transmissions, e.g., in a rank 2 MIMO configuration, the wireless communication device 102 can communicate a rank indicator value of 1 to the LTE wireless network 300 before switching one of the receivers over to provide reception of signals from the CDMA 2000 1× wireless network 200.

Figure 8A:
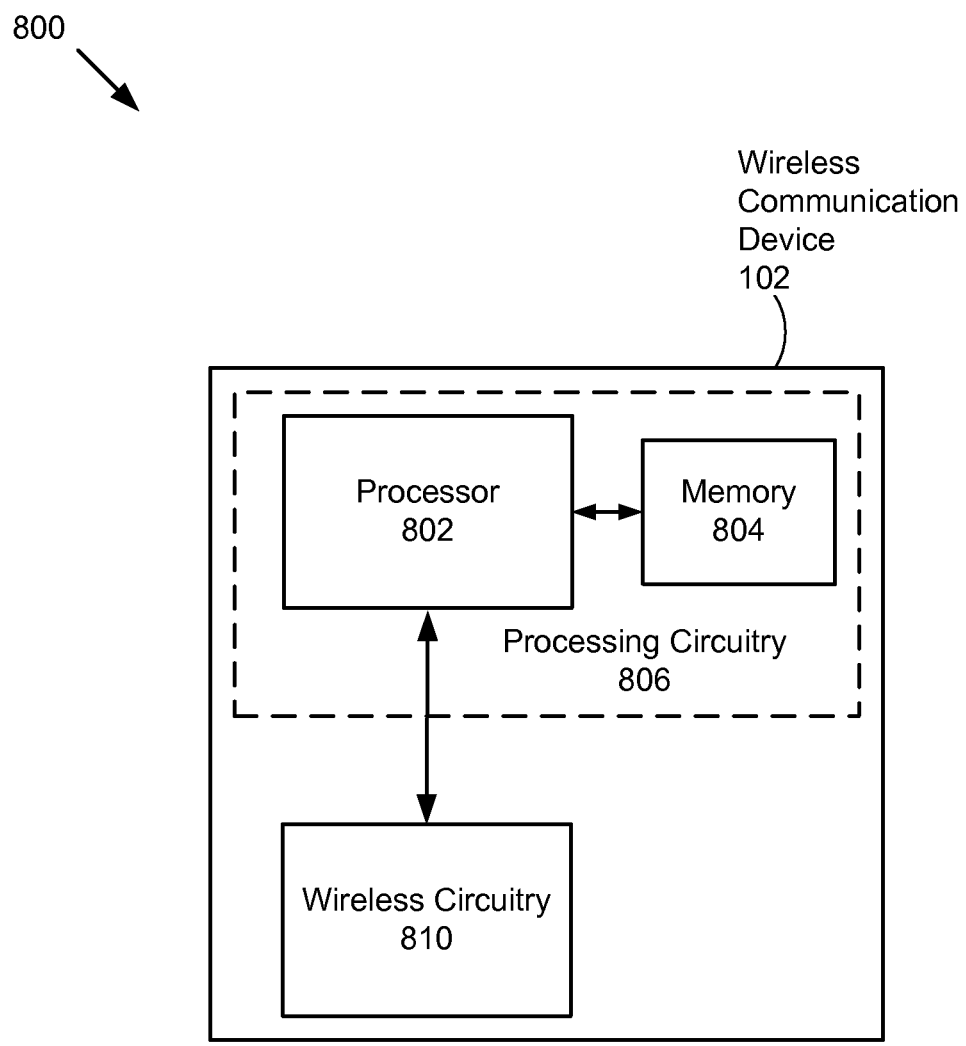
FIG. 8A illustrates a representative set of processing elements of a wireless communication device in accordance with some embodiments.

FIG. 8A illustrates a diagram 800 of a representative set of processing elements of a single radio wireless communication device 102 in accordance with some embodiments. The wireless communication device 102 can include a set of wireless circuitry 810 that can provide for communication with multiple wireless networks, e.g., the LTE wireless network 300 and the CDMA 2000 1× wireless network 200. The wireless circuitry 810 in the wireless communication device 102 can include one or more wireless circuitry modules including processors and wireless circuitry to transmit and receive wireless signals according to various wireless communication protocols. A wireless circuitry module (which can also be referred to as a wireless subsystem) of the wireless communication device 102 can include transmitters and receivers to provide signal processing of radio frequency wireless signals formatted according to wireless communication protocols, e.g., according to an LTE wireless communication protocol, a CDMA 2000 1× wireless communication protocol, or another cellular wireless communication protocol. In some embodiments, the wireless circuitry module can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The wireless circuitry module can be also referred to as a radio in some embodiments.

The wireless circuitry 810 of the single radio wireless communication device 102 of FIG. 8A can include wireless processing blocks, as illustrated in FIG. 7, in some embodiments. The wireless circuitry 810 of the wireless communication device 102 can be connected to high layer processing circuitry 806 that includes a host/application processor 802 connected to memory 804. In some embodiments, the wireless circuitry 810 includes its own wireless control processor. In some embodiments, the wireless circuitry 810 can be controlled by one or more processors contained therein and/or by the host/application processor 802 to be configured in one of the four different operating modes described hereinabove. In some embodiments, the wireless circuitry 810 is configured to switch between different operating modes based on requirements for communication with two or more different wireless networks, e.g., the LTE wireless network 300 and the CDMA 2000 1× wireless network. The wireless circuitry 810 can be configured to switch between different operating modes that provide for single receiver reception from one wireless network and simultaneous single receiver reception from another wireless network. In some embodiments, the wireless circuitry 810 can be configured for different operating modes based on a set of signal conditions, e.g., measurements of receive signal strength and/or signal quality for one or more wireless networks. In some embodiments, the wireless circuitry 810 can be configured for different operating modes based on an operation to be performed, e.g., to register with a network, to originate a voice connection, to receive a paging message, to provide a location area update, to transmit and/or receive an SMS message, to receive an incoming voice connection, to measure a serving cell, to measure one or more neighbor cells, to perform an "out of service" recovery procedure, etc. In some embodiments, the processing circuitry 806 and/or the wireless circuitry 810 can determine a set of values to include in one or more channel status reports to send to the LTE wireless network 300 before and/or during a tune-away event, e.g., in advance of switching different operating modes. The LTE wireless network 300 can adjust downlink transmissions, e.g., from a MIMO mode to a transmit diversity mode, in order to align the format used for downlink transmissions to match to a receiver configuration of the single radio wireless communication device 102, e.g., when changing from a dual receiver mode before a tune-away event to a single receiver mode during a tune-away event and back to a dual receiver mode after a tune-away event. The single radio wireless communication device 102 can be aware of times for tune-away events, e.g., a regular "wake" period of a DRX cycle on the CDMA 2000 1× wireless network 200, which can require use of at least a single receiver to listen for pages from the CDMA 2000 1× wireless network 200. The single radio wireless communication device 102 can determine values of a channel quality indicator (CQI) that corresponds to the use of one receiver and provide that information to the LTE wireless network 300 sufficiently in advance so that the LTE wireless network 300 can send data in an appropriate format (e.g., with a modulation coding scheme that can be decoded with only one receiver given the receive conditions at the single radio wireless communication device 102). The single radio wireless communication device 102 can also provide a rank indicator (RI) value of "one" in advance of a tune-away event so that the LTE wireless network 300 does not provide MIMO transmission during the tune-away event to the single radio wireless communication device 102 when only one receiver at most can be available to receive signals from the LTE wireless network 300. In an embodiment, the LTE wireless network 300, e.g., via the eNodeB 310, provides a rank indication to the single radio wireless communication device 102 in a physical downlink control channel (PDCCH) in response to one or more channel status reports, e.g., as part of a scheduled grant. In an embodiment, the single radio wireless communication device 102 waits for a rank indication of one from the LTE wireless network 300 before tuning away a receiver to the CDMA 2000 1× wireless network. In an embodiment, the single radio wireless communication device 102 estimates a time for the eNodeB 310 and/or other network elements of the LTE wireless network 300 to respond to channel status report information provided by the single radio wireless communication device 102 and sends the channel status reports in advance of a tune-away event by an estimated time period to realize a change in parameters for downlink transmissions from the LTE wireless network 300 to the single radio wireless communication device 102, e.g., a rank indication value of one and/or a change in values of a modulation coding scheme used to correspond to the use of one receiver for reception of signals from the LTE wireless network 300 during the tune-away event.

Figure 8B:
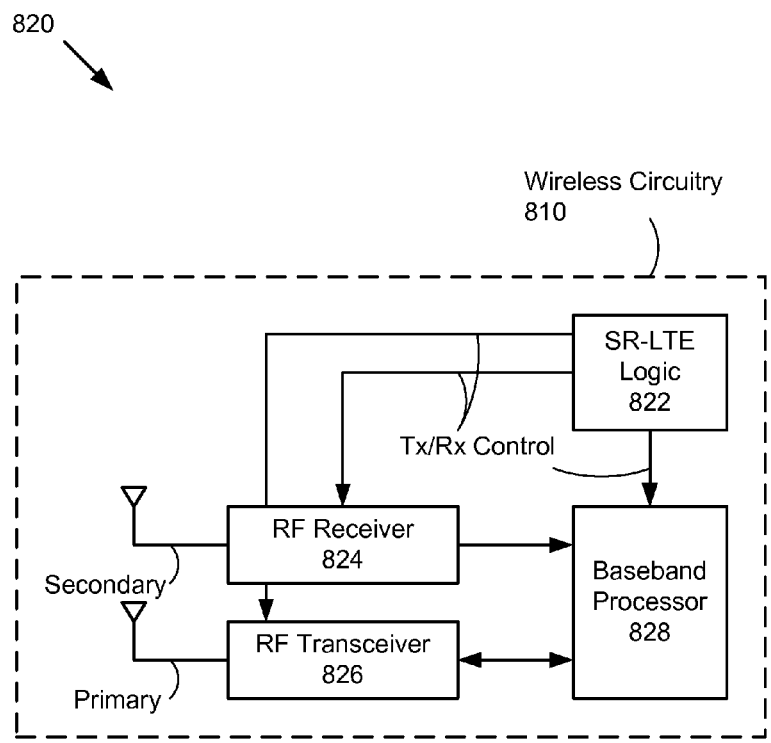
FIG. 8B illustrates another representative set of processing elements of a wireless communication device in accordance with some embodiments.

FIG. 8B illustrates a diagram 820 of a representative set of processing elements of wireless circuitry 810 of a single radio wireless communication device 102, in accordance with some embodiments. The wireless circuitry 810 can be used to convert digital data packets to analog radio frequency waveforms to transmit to a wireless network (e.g., the CDMA 2000 1× wireless network 200 or the LTE wireless network 300) and to receive, decode, and convert analog radio frequency waveforms from a wireless network singly (e.g., the CDMA 2000 1× wireless network 200 or the LTE wireless network 300) or from two different wireless networks simultaneously (e.g., both the CDMA 2000 1× wireless network 200 and the LTE wireless network 300). The wireless circuitry 810 can include a primary receive signal chain that receives signals from a primary antenna and processes the received signals by a radio frequency transceiver 826 (which can include a radio frequency transmitter and a radio frequency receiver) which in turn provides the processed received signals to a baseband processor 828 for further processing. The primary antenna and the radio frequency transceiver 826 can also transmit signals provided by the baseband processor 828. The baseband processor 828 can operate in accordance with an LTE wireless communication protocol for signals received from and transmitted to the LTE wireless network 300. The baseband processor 828 can also operate in accordance with a CDMA 2000 1× wireless communication protocol for signals received from and transmitted to the CDMA 2000 1× wireless communication network 200. The wireless circuitry 810 can include a secondary receive signal chain associated with a second antenna and a radio frequency receiver 824 (separate from the radio frequency transceiver 826), which can provide received radio frequency signals to the baseband processor 828 for processing in parallel with signals received and transmitted by the radio frequency transceiver 826. The RF receiver 824 and the RF transceiver 826 can be provided transmit and receive (Tx/Rx) control signals from a set of single radio LTE logic 822 included in (and/or associated with) the wireless circuitry 810. The SR LTE logic 822 can also communicate Tx/Rx control signals to the baseband processor 828. The SR LTE logic 822 can control the use of the "secondary" RF receiver 824 and the "primary" RF transceiver 826 to operate in one of the four modes described hereinabove. For example, using "mode 1," the SR-LTE logic 822 can configure (via the Tx/RX control signals) the RF receiver 824 and the RF transceiver 826 to be used for transmission and reception of signals from the LTE wireless network 300. Using "mode 1", LTE wireless network 300 signals can be received using MIMO (rank 2 or higher) or with transmit diversity (rank 1). Using "mode 2," the SR-LTE logic 822 can configure the RF receiver 824 to receive signals from the CDMA 2000 1× wireless network 200, e.g., during a tune-away event to listen for paging messages or measure signals from non-LTE wireless networks, and configure the RF transceiver 826 for transmission and single receiver reception from the LTE wireless network 300. Using "mode 3," the SR-LTE logic 822 can configure the RF transceiver 826 to transmit signals to and receive signals from the CDMA 2000 1× wireless network 200, e.g., during a tune-away event for a location area update or to establish a mobile originated voice connection via the CDMA 2000 1× wireless network, and continue to use the RF receiver 824 to receive signals from the LTE wireless network 300. In advance of reconfiguration to "mode 2" or "mode 3", the wireless circuitry 810 can provide an indication or preference for "rank 1" data reception from the LTE wireless network 300, as only one receiver can be available for use with the LTE wireless network 300 while operating the single radio wireless communication device 102 in "mode 2" or "mode 3." Using "mode 4," the SR-LTE logic 822 can configure the RF receiver 824 and the RF transceiver 826 to receive signals from the CDMA 2000 1× wireless network 200, and also provide for transmitting signals to the CDMA 2000 1× wireless network 200 via the RF transceiver 826. "Mode 4" can be used when signal reception on the CDMA 2000 1× wireless network 200 can require receive diversity, e.g., in order to extract information from weak signals or in the presence of a high level of noise and/or interference. In some embodiments, the single radio wireless communication device 102 can determine whether to use "mode 4" based at least in part on a measurement of signal strength and/or signal quality for signals received from the CDMA 2000 1× wireless network 200.

As described hereinabove, the single radio wireless communication device 102 can send one or more channel status reports including values that indicate a preference for "lower data rate" and/or "lower rank" transmissions in the downlink direction from the LTE wireless network 300 in advance of a tune-away event. The eNodeB 310 can provide a "rank 1" indication and/or a change in modulation coding scheme (MCS) value in a scheduling grant to the wireless communication device 102 in response to (and/or based at least in part on) the channel status reports. In some circumstances the eNodeB 310 of the LTE wireless network 300 can continue provide a "rank 2" indication for downlink transmissions to the single radio wireless communication device 102. In some embodiments, the single radio wireless communication device 102, while configured in mode 2 or mode 3 in which only one receiver can be used to receive downlink transmissions from the LTE wireless network 300, can monitor an average downlink block error rate (BLER), e.g., based on computations using a cyclic redundancy check (CRC) of packet data received on the physical downlink shared channel (PDSCH). The BLER can provide an indication of channel conditions in addition to other measurements of signal strength and/or signal quality at the wireless communication device 102. When the BLER exceeds a BLER threshold value and/or when the SINR falls below an SINR threshold value and/or when the signal strength falls below a signal strength threshold value, the wireless communication device 102 can perform one or more of the following actions: (1) discard one or more downlink transmissions, (2) report a NACK to the eNodeB 310, and (3) adjust report values for the CQI downward and values for the RI equal to one. The eNodeB 310 can respond by retransmitting the negatively acknowledged data transmissions. As the eNodeB 310 can average or filter the instantaneous reported CQI and RI values, e.g., to smooth variations, to provide "smoothed" or "filtered" CQI and RI values, the eNodeB 310 can impose a delay (directly or indirectly) from reporting an instantaneous CQI and/or RI value to a change in MCS values and/or RI values used for downlink transmissions to the wireless communication device 102. The wireless communication device 102 can obtain a time constant (or equivalently a time delay value) for CQI and/or RI value filtering associated with the eNodeB 310 of the LTE wireless network 300. The wireless communication device 102 can use the obtained time delay value to adjust when CQI values and/or RI values are adjusted and reported to the eNodeB 310 in advance of the start and/or the end of a tune-away event to account for the delay introduced by the eNodeB 310 filtering of the reported CQI and/or RI values. In some embodiments, the wireless communication device 102 pre-emptively reports a rank indictor value of one before each tune-away event, e.g., sufficiently in advance of the tune-away events based on an obtained network time delay estimate. The network time delay can vary for different LTE wireless networks 300, and the wireless communication device 102 can obtain the time delay for a particular LTE wireless network 300 by estimating the value, by querying a network based server, by querying a third party server, or by retrieving a stored value for the time delay from a storage element in the wireless communication device 102. In some embodiments, when the eNodeB 310 continues to use a rank 2 downlink transmission during all or a portion of a tune-away event, the wireless communication device 102 can attempt to decode the rank 2 downlink transmissions in certain circumstances. For example, when there is a large difference in receive signal strength and/or signal quality between a first downlink signal path through a first antenna (e.g., a first "spatial" path) and a second downlink signal path through a second antenna (e.g., a second "spatial" path), the wireless communication device 102 can consider one signal path to contain "good" data and the other signal path to contain "noise." The wireless communication device 102 can decode the "stronger" spatial path and report a NACK for the "weaker" spatial path to the eNodeB 310 of the LTE wireless network 300. In a MIMO transmission mode, the wireless communication device 102 can determine characteristics for each independent signal path, e.g., SINR values for each signal path and associated CQI values for each signal path. When a difference in SINR values and/or CQI values between two signal paths exceeds a threshold value, the wireless communication device 102 can decode data the first stronger signal path and discard data from the second weaker signal path. The wireless communication device 102 can also report a NACK for data received via the second weaker signal path to the eNodeB 310 of the LTE wireless network 300. In some embodiments, the wireless communication device 102 can treat the received signal from the "weaker" signal path as "un-decodable" noise, and can decode the received signal on the "stronger" signal path based on an estimate of the signal from the "weaker" signal path as noise.

In some embodiments, the wireless communication device 102 can adjust reported values of the channel status reports, e.g., the CQI and/or RI values, in order to ensure and/or improve the decoding success at the wireless communication device 102 for downlink data transmissions from the LTE wireless network 300 during tune-away events. When a tune-away event corresponds to monitoring pages on the CDMA 2000 1× wireless network or measuring signals for cell selection and reselection, the wireless communication device 102 can communicate a rank indicator of value of "one" for the tune-away event. In addition, the wireless communication device 102 can adjust CQI values to account for the use of only one receiver for decoding downlink transmissions during the tune-away event. CQI values can correspond to calculated signal to interference plus noise ratios (SINR) measured by the receive signal processing wireless circuitry of the wireless communication device 102. SINR values can be mapped to appropriate CQI values using a formula, algorithm, and/or table lookup procedure. For a two by two (2×2) MIMO system, a communication channel in the downlink direction from the eNodeB 310 of the LTE wireless network 300 to the wireless communication device 102 can be characterized by a channel matrix H as defined in Equation (1), in which $\vec{h}_1$ represents the two parallel channel paths between the first transmitter at the eNodeB 310 and the two separate receivers at the wireless communication device 102, while $\vec{h}_2$ represents the two parallel channel paths between the second transmitter at the eNodeB 310 and the two receivers at the wireless communication device 102, and thus $h_{ij}$ represents the channel path between the $i^{th}$ receiver and the $j^{th}$ transmitter.

$$H = [\vec{h}_1 \ \vec{h}_2] = \begin{bmatrix} h_{11} & h_{12} \\ h_{21} & h_{22} \end{bmatrix} \quad (1)$$

The channel matrix H defines an input-output relationship illustrated by Equation (2) in which $\vec{x}$ represents a vector of inputs to the channel and $\vec{y}$ represents a vector of outputs that include additive noise/interference $\vec{n}$.

$$\vec{y} = H\vec{x} + \vec{n} \quad (2)$$

When rank one transmission is used, the two transmitters at the eNodeB 310 can send combinations of data to realize transmit diversity. The rank one transmission can be defined by a precoding vector $$\vec{w} = \begin{bmatrix} w_1 \\ w_2 \end{bmatrix},$$

and a modified channel $\vec{h}$ that combines the previous matrix channel H with the precoding vector $\vec{w}$ can be defined as shown in Equation (3).

$$\vec{h} = H\vec{w} = w_1 \vec{h}_1 + w_2 \vec{h}_2 \quad (3)$$

A signal to interference plus noise ratio (SINR) at the receiver of the wireless communication device for the $i^{th}$ sub-carrier with a noise variance of $N_0$ can be defined as shown in Equation (4).

$$SINR_i = \frac{\|\vec{h}_i\|^2}{N_0} \quad (4)$$

If the number of receivers available to receive the rank one transmission is only one (e.g., during a tune-away event), then the channel matrix can be reduced to a scalar $\hat{h}$ as defined in Equation (5).

$$\hat{h} = w_1 h_{11} + w_2 h_{12} \quad (5)$$

The SINR at the output of a single receiver mode SINR (1Rx) can be related to the SINR at the output for a dual receiver mode SINR(2Rx) as defined in Equation (6).

$$SINR(1Rx) = SINR(2Rx) - \frac{|w_1 h_{21} + w_2 h_{22}|^2}{N_0} \quad (6)$$

As discussed further herein below, when the eNodeB 310 schedules a rank two transmission in the downlink direction and when only one receiver is available at the wireless communication device 102, e.g., during a tune-away event, to decode the downlink transmission from the LTE wireless network 300, the wireless communication device can perform a number of different actions based on a set of conditions including, but not limited to, a transmission mode, a difference in signal quality, e.g., as indicated by CQI values, between the two different downlink spatial layers, SINR values, and an average downlink block error rate, e.g., as computed from cyclic redundancy checks. In an embodiment, the wireless communication device 102 discards downlink transmissions altogether and reports a negative acknowledgement (NACK) in the uplink direction to the eNodeB 310 and then aggressively adjusts the reported CQI values to lower numbers (e.g., to reduce the downlink transmission rate) and reports an RI value of one. In an embodiment, the wireless communication device 102 preemptively reports an RI value of one before every tune-away event when listening for pages from the CDMA 2000 1x wireless network to avoid the eNodeB 310 scheduling rank two (MIMO downlink transmissions. In an embodiment when the wireless communication device receives a scheduled grant indicating a transmission mode "four" value, corresponding to transmit diversity or closed loop spatial diversity to be used in the downlink direction, and when a difference signal quality (e.g., as indicated by CQI values) between the two streams exceeds a threshold value (which can also be indicated by a different in modulation coding scheme (MCS) values between the two streams that exceeds a threshold value), the wireless communication device 102 can order the two different downlink spatial layers according to their respected received SINR values and decode the "stronger" spatial layer, e.g., "stronger" being indicated by one or more of SINR values, CQI values, and MCS values. The wireless communication device 102 can consider the downlink transmissions of the second "weaker" spatial layer as additive noise, e.g., by using a standard minimum mean squared error receiver. In an embodiment, the wireless communication device 102 can decode one spatial layer and can report a NACK for the other spatial layer. A signal model can be defined as shown in Equation (7), in which the variable z represents an inter-stream interference as a combination of the weaker stream received signal $h_2 x_2$ plus additive noise n. In an embodiment, the wireless communication device 102 continues to report a rank indicator value of one to the eNodeB 310 when using only one receiver and awaits the reported rank indicator value of one to take effect at the eNodeB 310.

$$y = h_1 x_1 + h_2 x_2 + n = h_1 x_1 + z \quad (7)$$

Figure 9A:
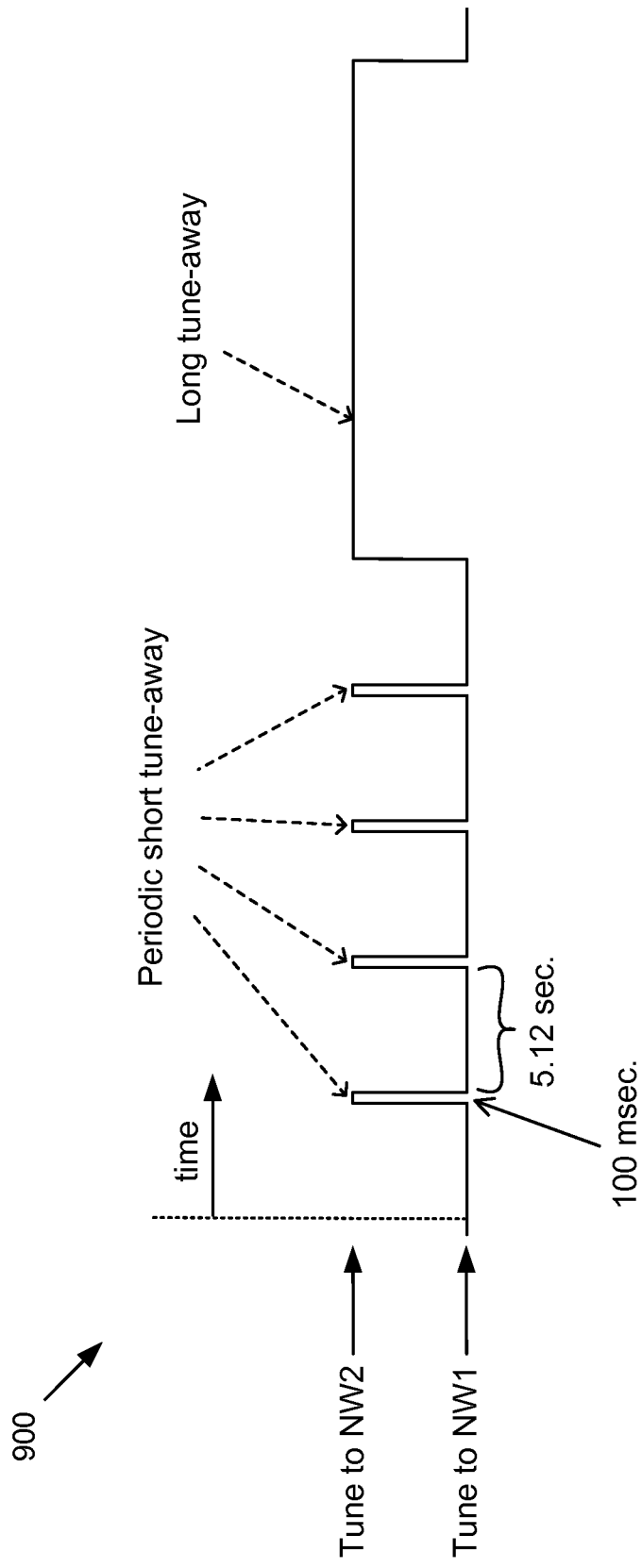
FIG. 9A illustrates a diagram of a set of radio frequency tune away events for a wireless communication device that communicates with two different wireless networks in accordance with some embodiments.

FIG. 9A illustrates a diagram 900 of a set of radio frequency tune-away events for a wireless communication device 102 that communicates with two different wireless networks (NW1 and NW2) in accordance with some embodiments. The wireless communication device 102 can be configured to communicate with the first wireless network NW1 (e.g., the LTE wireless network 300) and during a short time period tune at least one receiver in the wireless communication device 102 to listen for signals from and/or transmit a short message or location update to the second wireless network NW2 (e.g., the CDMA 2000 1x wireless network 200). For a short tune-away time period, the connection with the LTE wireless network 300 can be interrupted without a loss of the LTE connection, i.e., the wireless communication device 102 can return from the short tune-away event to resume communication with the LTE wireless network 300. In some embodiments, the wireless communication device 102 can determine to use a first receiver associated with a transmitter during the short tune-away event, e.g., for providing a location area update or an SMS message to the CDMA 2000 1x wireless network 200. In some embodiments, the wireless communication device 102 can simultaneously continue to use a second receiver with the LTE wireless network 300 while communicating with the CDMA 2000 1x wireless network 200 during the short tune-away event. The wireless communication device 102 can determine whether to use a receiver only or a transmitter and a receiver for communication during the tune-away event based on actions to be performed during the tune-away event. In some embodiments, the wireless communication device 102 can tune multiple receivers to the second wireless network, e.g., the CDMA 2000 1× wireless network 200, during the tune-away event, e.g., when a set of signal conditions indicate that reception of signals from the CDMA 2000 1× wireless network 200 can require receive diversity. During a tune-away event, the wireless communication device 102 can change the use of receivers, e.g., between two different receivers and/or from the use of one receiver to the use of two receivers based on actions undertaken, received signals, received messages, or other conditions. In an embodiment, the wireless communication device 102 can tune a first receiver to the CDMA 2000 1× wireless network 200 to listen for a paging event, and in response to receiving a paging message can reconfigure the wireless communication device to use both a transmitter and a receiver (or multiple receivers) to establish a mobile terminated voice connection with the CDMA 2000 1× wireless network 200. In an embodiment, the wireless communication device can receive a message from the LTE wireless network 300 in advance of a tune-away event that indicates an incoming voice connection on the CDMA 2000 1× wireless network 200, and the wireless communication device 102 can tune one or more receivers and a transmitter to establish a connection with the CDMA 2000 1× wireless network 200 during the tune-away event. A voice connection with the CDMA 2000 1× wireless network 200 can be represented as a "long" tune-away event as illustrated in FIG. 9. In some embodiments, the wireless communication device 102 can determine a number of receivers to use for the voice connection during the tune-away event based on a set of measured signal metrics for the CDMA 2000 1× wireless network, e.g., a measure of signal strength and/or signal quality that can indicate whether the wireless communication device 102 operates in an area of "good" signal coverage or an area of "poor" signal coverage. In some embodiments, the wireless communication device 102 determines whether to use one or multiple receivers during the tune-away event based on comparing one or more receive signal metrics to one or more thresholds. In some embodiments, in an instance when reconfiguring from the use of multiple receivers by the LTE wireless network 300 to use of a single receiver by the LTE wireless network 300, the wireless communication device 102 can provide an indication to the LTE wireless network 300, e.g., through one or more signaling messages, of a preference to receive communication through only one receiver, e.g., a preference for downlink transmit diversity rather than MIMO transmission. In some embodiments, the wireless communication device 102 communicates the preference using a rank indicator in a channel status report message.

Figure 9B:
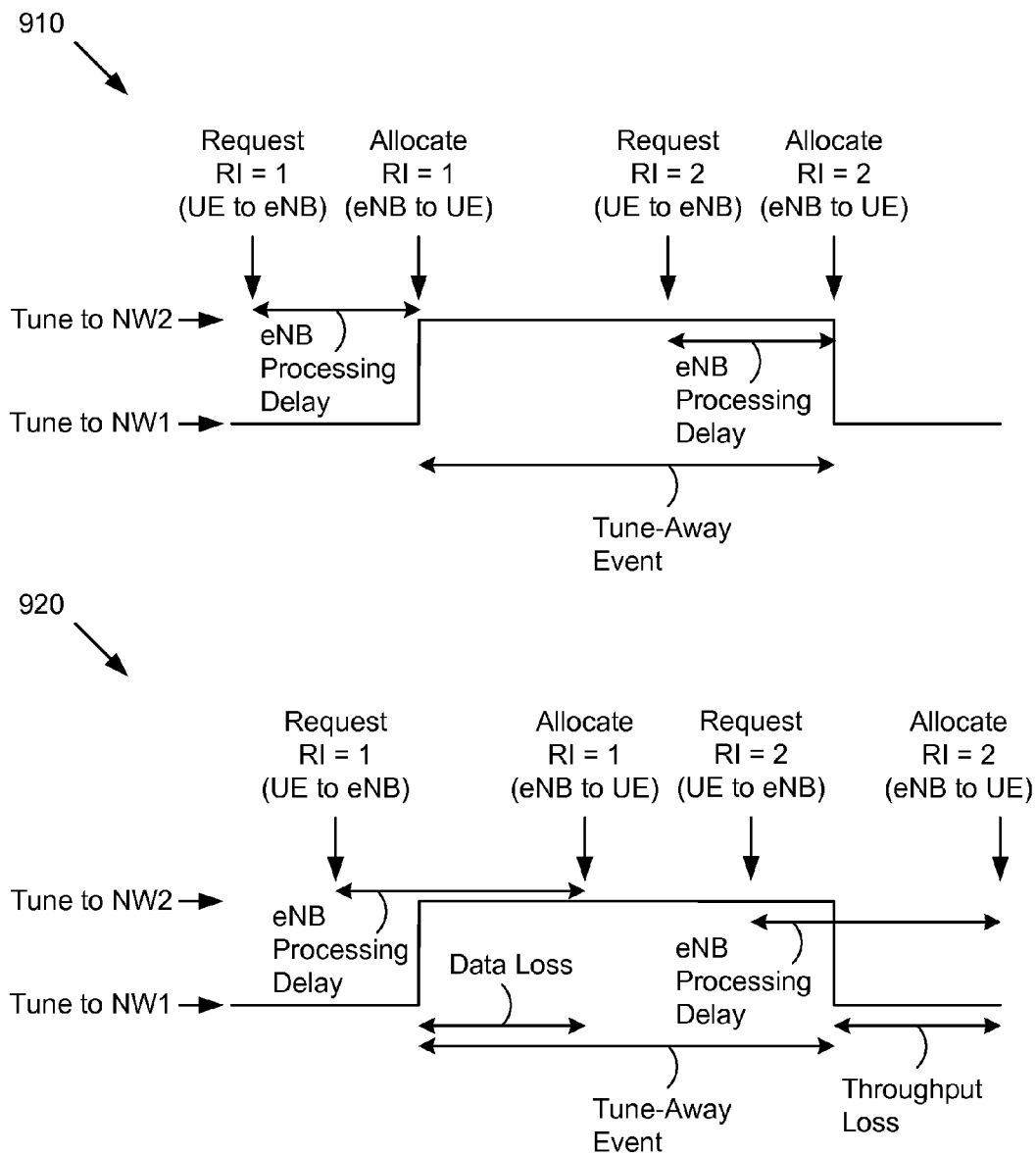
FIG. 9B illustrates additional diagrams of timing for a set of messages associated with a set of tune away events for a wireless communication device that communicates with two different wireless networks in accordance with some embodiments.

FIG. 9B illustrates additional diagrams 910/920 of timing for a set of messages associated with a set of tune away events for a wireless communication device 102 that communicates with two different wireless networks in accordance with some embodiments. In the first diagram 910, the wireless communication device 102 (equivalently a user equipment or UE) communicates a rank indicator request value of "one" before a tune-away event in advance by a time period corresponding to an eNodeB 310 (eNB) processing delay of the LTE wireless network 300. The first network NW1 can correspond to the LTE wireless network 300, while the second network NW2 can correspond to the CDMA 2000 1× wireless network 200. The eNodeB 310 of the LTE wireless network 300 can allocate for downlink transmissions to the wireless communication device 102 a rank indicator value of "one" at approximately the start of the tune-away event. The wireless communication device 102 can also send a rank indicator request value of "two" before the end of the tune-away event, again by in advance by the time period corresponding to the eNodeB 310 processing delay, and the eNodeB 310 of the LTE wireless network 300 can respond with an indication of rank two downlink transmissions to the wireless communication device 102 at approximately the end of the tune-away event, i.e., corresponding to returning from the tune-away event. During tune-away event, the wireless communication device 102 can use one receiver to receive transmissions from the LTE wireless network 300 and a second receiver to receive transmissions from (and/or listen for pages from, measure signals from, or perform other procedures with) the CDMA 2000 1× wireless network 200 (or another non-LTE wireless network). In some embodiments, the wireless communication device 102 can obtain a value for the eNodeB 310 processing delay as described hereinabove. The second diagram 910 illustrates the wireless communication device 102 communicating the rank indicator value at a time that is insufficient to compensate for the eNodeB 310 processing delay. The eNodeB 310 can respond with a rank indicator of "one" for downlink transmissions part way into the tune-away event, and during the first part of the tune-away event data can be lost. During the "data loss" time period, the wireless communication device 102 can attempt to decode the received data, can discard the received data, can decode data received along a strongest spatial signal path, and can send NACK messages to the eNodeB 310 for one or both spatial signal paths. The second diagram 910 also illustrates returning from the tune-away event before the eNodeB 310 responds to a request to return to a rank indication of "two." The wireless communication device 102 can receive the "rank one" data but downlink throughput from the eNodeB 310 to the wireless communication device 102 can be lower than otherwise possible with "rank two" downlink transmissions.

Figure 10A:
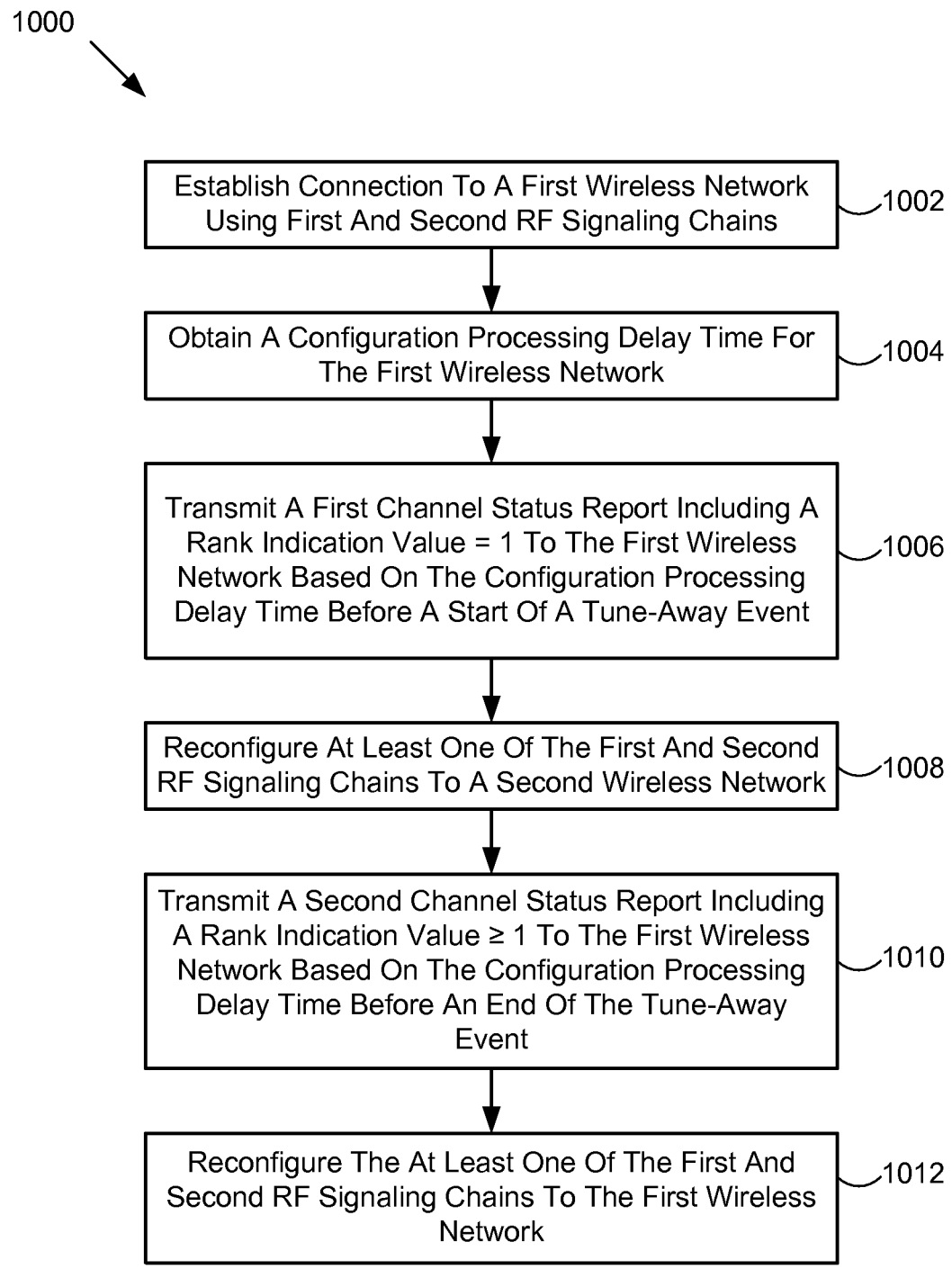
FIG. 10A illustrates a representative embodiment to configure wireless circuitry in a single radio wireless communication device to receive signals from two wireless networks in accordance with some embodiments.

FIG. 10A illustrates a flow chart 1000 of a representative embodiment to configure wireless circuitry in a single radio wireless communication device 102 to receive signals from two wireless networks in accordance with some embodiments. In an embodiment, a first wireless network operates in accordance with a long term evolution (LTE) wireless communication protocol, e.g., the LTE wireless network 300, and a second wireless network operates in accordance with a third generation (3G) wireless communication protocol, e.g., the CDMA 2000 1× wireless network 200. In a first step 1002, the wireless communication device 102 establishes a connection with the first wireless network using a first radio frequency signaling chain and a second radio frequency signaling chain. In an embodiment, the first and second radio frequency signaling chains include at least wireless circuitry 810 as illustrated in FIGS. 8A and 8B and described hereinabove, or a set of receivers (Rx0, Rx1) 712/716 and associated voltage controlled crystal oscillators (VCXOs) 710/714 as illustrated in FIG. 7 and described hereinabove. In some embodiments, a radio frequency signaling chain can also be referred to as a receiver, a receive signaling chain, a receive portion of a transceiver, or a receive portion of wireless circuitry in a wireless communication device 102. In step 1004, the wireless communication device 102 obtains a configuration processing delay associated with the first wireless network. In some embodiments, the wireless communication device 102 obtains the configuration processing delay from a network element, e.g., an eNodeB 310 or equivalent network entity, of the first wireless network. In some embodiments, wireless communication device 102 obtains the configuration processing delay from a network-based server or from a third party server. In some embodiments, the wireless communication device 102 obtains the configuration processing delay by retrieving a value from storage (e.g., memory) associated with and/or in the wireless communication device 102. In some embodiments, the wireless communication device 102 obtains the configuration processing delay for the first wireless network by estimating a value for the configuration processing delay based on times between transmitting one or more particular signaling messages to the first wireless network and receiving at least one response based on the one or more particular signaling messages transmitted to the first wireless network. In step 1006, the wireless communication device transmits a first channel status report to the first wireless network, the first channel status report including a rank indication value equal to one. The first channel status report is transmitted at a time before the start of a tune-away event based at least in part on the configuration processing delay value obtained, e.g., by at least the value obtained. In step 1008, the wireless communication device 102 reconfigures one of the first and second radio frequency signaling chains to connect to the second wireless network. During the tune-away event, the wireless communication device 102 receives signals from the second wireless network and from the first wireless network through two separate radio frequency signaling chains in parallel. In some embodiments, the wireless communication device 102 selects which radio frequency signaling chain to reconfigure from the first wireless network to the second wireless network based on one or more of: a measured receive signal strength and/or signal quality for signals received on the second wireless network, one or more actions to perform during the tune-away event, and a priority for communication through and/or with the first or second wireless networks. In some embodiments, the wireless communication device 102 discards all or portions of data received during a tune-away event from the first wireless network. In some embodiments, the wireless communication device 102 communicates a NACK message to the first wireless network in response to all or portions of data received during a tune-away event from the first wireless network. In step 1010, the wireless communication device 102 transmits a second channel status report including a rank indication value equal to or greater than "one", e.g., a rank indication value of "two", to the first wireless network, the second channel status report sent at a time before the end of the tune-away event based at least in part on the configuration processing delay value obtained, e.g., by at least the value obtained. In step 1012, the wireless communication device 102 reconfigure the at least one of the first and second radio frequency signaling chains so that both the first and second radio frequency signaling chains are used for communication with the first wireless network.

Figure 10B:
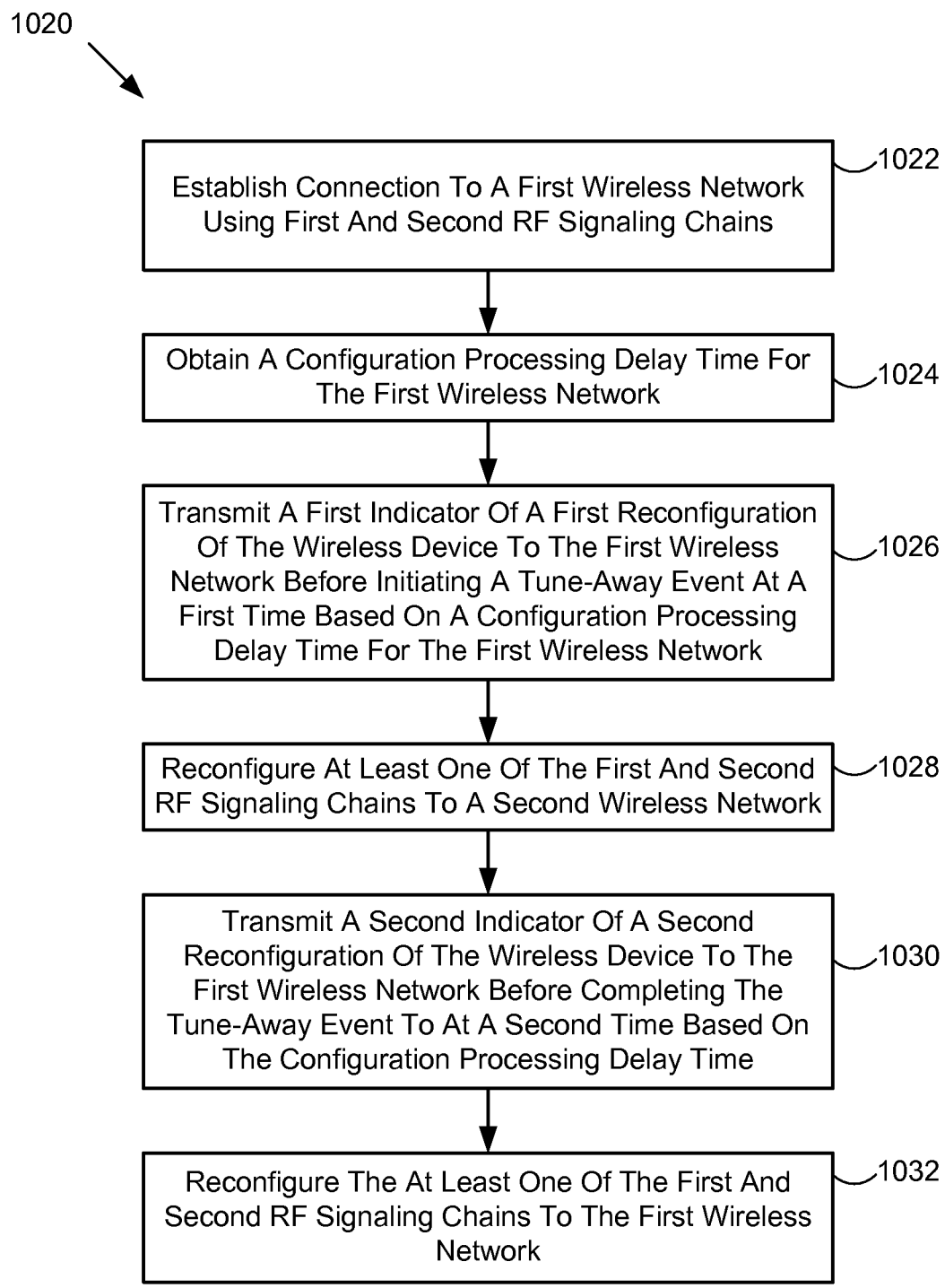
FIG. 10B illustrates another representative embodiment to configure wireless circuitry in a single radio wireless communication device to receive signals from two wireless networks in accordance with some embodiments.

FIG. 10B illustrates a flow chart 1020 of another representative embodiment to configure wireless circuitry in a single radio wireless communication device to receive signals from two wireless networks in accordance with some embodiments. In some embodiment, the first wireless network operates in accordance with a long term evolution (LTE) wireless communication protocol, e.g., the LTE wireless network 300, and the second wireless network operates in accordance with a legacy third generation (3G) wireless communication protocol, e.g., the CDMA 2000 1× wireless network 200. In a first step 1022, the wireless communication device 102 establishes a connection with the first wireless network using a first radio frequency signaling chain and a second radio frequency signaling chain. In some embodiments, the first and second radio frequency signaling chains include at least wireless circuitry 810 as illustrated in FIGS. 8A and 8B and described hereinabove, or a set of receivers (Rx0, Rx1) 712/716 and associated voltage controlled crystal oscillators (VCXOs) 710/714 as illustrated in FIG. 7 and described hereinabove. In step 1024, the wireless communication device 102 obtains a configuration processing delay for the first wireless network, e.g., in one or more messages from a network-based entity, from local storage associated with and/or in the wireless communication device 102, and/or estimated by the wireless communication device 102, e.g., based on measuring time between transmitting signaling messages to the first wireless network and receiving responses to the signaling messages from the first wireless network. In step 1026, the wireless communication device 102 transmits a first indicator of a first reconfiguration of the wireless communication device to the first wireless network. The first indicator is transmitted at a first time based at least in part on the configuration processing delay time obtained for the first wireless network. In some embodiments, the first indicator is transmitted before initiating a tune-away event, in which one or more radio frequency signaling chains reconfigured to a second wireless network from the first wireless network. In some embodiments, the first time at which the first indicator is transmitted precedes the start of the tune-away event by at least a value for the configuration processing delay time of the first wireless network. In step 1028, the wireless communication device 102 reconfigures at least one of the first and second radio frequency signaling chains from the first wireless network to the second wireless network. During the tune-away event, the wireless communication device 102 receives signals from the second wireless network and from the first wireless network through separate radio frequency signaling chains in parallel. As described hereinabove, the wireless communication device 102 can perform a number of tasks during the tune-away event including, but not limited to, listening for page messages, measuring serving and/or neighbor cells, performing intra-radio access technology (intra-RAT) and/or inter-RAT measurements, initiating and/or processing a mobile-originated voice call, initiating and/or processing a mobile-terminated voice call, etc. In some embodiments, the wireless communication device 102 discards all or portions of data received during a tune-away event from the first wireless network. In some embodiments, the wireless communication device 102 communicates a NACK message to the first wireless network in response to all or portions of data received during a tune-away event from the first wireless network. In step 1030, the wireless communication device 102 transmits a second indicator of a second reconfiguration of the wireless communication device 102 to the first wireless network before completing the tune-away event. The wireless communication device 102 transmits the second indicator at a second time based at least in part on the configuration processing delay time obtained for the first wireless network. In step 1032, the wireless communication device 102 reconfigures the at least one of the first and second radio frequency signaling chains to use both the first and second radio frequency signaling chains for communication with the first wireless network.

In some embodiments, the radio frequency tune-away event corresponds to a time period during which the wireless communication device 102 reconfigures during a "wake" cycle of a discontinuous receive (DRX) cycle to listen for signals (e.g., page messages) or to measure signals (e.g., for cell selection/reselection) from the second wireless network. In some embodiments, the tune-away event is associated with establishing a connection for a mobile originated or mobile terminated voice connection with the second wireless network. In some embodiments, the mobile wireless device 102 determines whether a set of receive signal conditions for connection to the second wireless network is satisfied. In some embodiments, the set of receive signal conditions is satisfied when a receive signal quality, a receive signal strength, or one or more other receive signal metrics exceed a set of threshold values. When the set of receive signal conditions is satisfied, the wireless communication device 102 reconfigures only one radio frequency signaling chain to connect to the second wireless network. In an embodiment, the wireless communication device 102 selects which of the radio frequency signaling chains to reconfigure based at least in part on whether a transmitter is required during the tune-away event. In some embodiments, the first radio frequency signaling chain is associated with a transmitter, while the second radio frequency signaling chain is not associated with the transmitter of the wireless communication device 102. In an embodiment, the set of receive signal conditions being satisfied indicates "good" signal coverage, e.g., a receive signal strength or receive signal quality exceeds a threshold, and the wireless communication device 102 can receive signals from the second wireless network reliably with only one receiver. In some embodiments, the set of receive signal conditions not being satisfied indicates "poor" signal coverage, e.g., the receive signal strength or receive signal quality fall below a threshold, and the wireless communication device 102 can require receive diversity as provided by multiple receivers in order to reliably receive signals from the second wireless network. In step 1010, when the set of receive signal conditions for connection to the second wireless network is not satisfied, the wireless communication device 102 reconfigures both of the first and second radio frequency signaling chains to connect with the second wireless network. In some embodiments, the wireless communication device 102 configures a transmitter in accordance with requirements for communication with the first wireless network or the second wireless network during the tune-away event. In some embodiments, the wireless communication device 102 determines which wireless network in a set of wireless networks with which to associate a radio frequency signaling chain in a set of radio frequency signaling chains in the wireless communication device based at least in part on requirements for communication with the wireless network, a set of receive signal conditions for the wireless network, and/or a prioritization for communication among the wireless networks in the set of wireless networks. In an embodiment, the set of wireless networks includes a first wireless network operating in accordance with an LTE wireless communication protocol and a second wireless network operating in accordance with a legacy 3G wireless communication protocol, the first wireless network providing packet-switched connections only, and the second wireless network providing at least circuit-switched connections. In an embodiment, the second wireless network provides voice connections for a CSFB procedure for the first wireless network. In some embodiments, connections to the second wireless network take priority over connections to the first wireless network.

In some embodiments, the wireless communication device 102 waits to initiate the tune-away event until receiving a response from the first wireless network in response to the first indicator, e.g., a signaling message that includes a rank indication value of one. In some embodiments, the first indicator transmitted to the first wireless network indicates the wireless communication device 102 is not configured to receive multiple input multiple output (MIMO) transmissions during the tune-away event, and the second indicator transmitted to the first wireless network indicates the wireless communication device 102 is configured to receive MIMO transmissions after completing the tune-away event. In some embodiments, the first indicator comprises a first channel status report including a first channel quality indicator (CQI) value determined based on use of only one of the first radio frequency signaling chain and the second radio frequency signaling chain by the wireless communication device 102 for signals received from the first wireless network during the tune-away event, and the second indicator provides a second channel status report including a second CQI value determined based on use of both the first radio frequency signaling chain and the second radio frequency signaling chain by the wireless communication device 102 for signals received after completing the tune-away event. In some embodiments, the first indicator comprises information to cause the first wireless network to adjust one or more downlink transmission properties for communication to the wireless communication device 102 to correspond to use of fewer radio frequency signaling chains during the tune-away event than before the tune-away event. In some embodiments, the second indicator comprises information to cause the first wireless network to adjust one or more downlink transmission properties for communication to the wireless communication device 102 to correspond to use of more radio frequency signaling chains after the tune-away event than during the tune-away event.

Representative applications of systems, methods, apparatuses, and computer program products according to the present disclosure are described in this section hereinabove. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the detailed description provided, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Software, hardware, or a combination of hardware and software can implement various aspects of the described embodiments. The described embodiments can also be encoded as computer program code and/or instructions on a non-transitory computer-readable medium. The non-transitory computer-readable medium is any data storage device that can store data that can thereafter be read by a computer system. Examples of the non-transitory computer-readable medium include read-only memory, random-access memory, CD-ROMs, DVDs, magnetic tape and optical data storage devices. The computer program code and/or instructions can also be distributed over network-coupled computer systems so that the computer program code and/or instructions are stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to configure wireless circuitry in a single radio wireless communication device, the method comprising:
   by the single radio wireless communication device:
      establishing a connection to a first wireless network using a first radio frequency signaling chain and a second radio frequency signaling chain;
      obtaining a configuration processing delay time for the first wireless network;
      transmitting a first indicator of a first reconfiguration of the single radio wireless communication device to the first wireless network before initiating a tune-away event, the first indicator transmitted at a first time that is based at least in part on the configuration processing delay time;
      reconfiguring at least one of the first radio frequency signaling chain and the second radio frequency signaling chain to communicate with a second wireless network during the tune-away event;
      transmitting a second indicator of a second reconfiguration of the single radio wireless communication device to the first wireless network before completing the tune-away event, the second indicator transmitted at a second time that is based at least in part on the configuration processing delay time; and
      reconfiguring the at least one of the first radio frequency signaling chain and the second radio frequency signaling chain to communicate with the first wireless network after completing the tune-away event,
      wherein the configuration processing delay time comprises a time for the first wireless network to process a channel status report (CSR) from the single radio wireless communication device and respond with a corresponding reconfiguration of downlink communication to the single radio wireless communication device based on the CSR.

2. The method of claim 1, wherein the first indicator comprises a first CSR including a rank indication value of one, and the second indicator comprises a second CSR including a rank indication value equal to or greater than one.

3. The method of claim 2, further comprising:
   by the single radio wireless communication device:
      waiting to initiate the tune-away event until receiving a first response that includes a rank indication value of one from the first wireless network.

4. The method of claim 1, wherein the first wireless network operates in accordance with a Long Term Evolution (LTE) wireless communication protocol, and the second wireless network operates in accordance with a Code Division Multiple Access (CDMA) 2000 1× wireless communication protocol, and wherein the second wireless network provides voice connections for a circuit-switched fallback (CSFB) procedure for the first wireless network.

5. The method of claim 1, wherein the first indicator transmitted to the first wireless network indicates the single radio wireless communication device is not configured to receive multiple input multiple output (MIMO) transmissions during the tune-away event, and the second indicator transmitted to the first wireless network indicates the single radio wireless communication device is configured to receive MIMO transmissions after completing the tune-away event.

6. The method of claim 1, wherein the first indicator comprises a first CSR including a first channel quality indicator (CQI) value determined based on use of only one of the first radio frequency signaling chain and the second radio frequency signaling chain by the single radio wireless communication device for signals received from the first wireless network during the tune-away event, and the second indicator provides a second CSR including a second CQI value determined based on use of both the first radio frequency signaling chain and the second radio frequency signaling chain by the single radio wireless communication device for signals received after completing the tune-away event.

7. The method of claim 6, wherein the configuration processing delay time indicates a value for a delay period during which the first wireless network processes CSR information including the first CQI value or the second CQI value provided by the single radio wireless communication device to the first wireless network and responds with a corresponding change for a rank indication or a modulation coding scheme for downlink transmission to the single radio wireless communication device.

8. The method of claim 5,
   by the single radio wireless communication device:
   waiting to initiate the tune-away event until receiving a first response that indicates a change in a rank indication or a modulation coding scheme for downlink transmission from the first wireless network.

9. The method of claim 1, wherein the single radio wireless communication device obtains the configuration processing delay time for the first wireless network by receiving a value for the configuration processing delay time from the first wireless network.

10. The method of claim 1, wherein the single radio wireless communication device obtains the configuration processing delay time for the first wireless network by estimating a value for the configuration processing delay time.

11. The method of claim 1, wherein the first time at which the single radio wireless communication device transmits the first indicator to the first wireless network precedes the start of the tune-away event by at least the configuration processing delay time.

12. The method of claim 1, wherein the first indicator transmitted to the first wireless network comprises information to cause the first wireless network to adjust one or more downlink transmission properties for communication to the single radio wireless communication device to correspond to use of fewer radio frequency signaling chains during the tune-away event than before the tune-away event.

13. A single radio wireless communication device comprising:
  one or more processors; and
  wireless circuitry in communication with the one or more processors, the wireless circuitry comprising:
    a radio frequency transmit signaling chain configurable for transmission to a first wireless network and to a second wireless network;
    a first radio frequency receive signaling chain configurable for reception from the first wireless network and from the second wireless network; and
    a second radio frequency receive signaling chain configurable for reception from the first wireless network and from the second wireless network,
  wherein the one or more processors are configured to cause the single radio wireless communication device to:
    communicate with the first wireless network using the radio frequency transmit signaling chain, the first radio frequency receive signaling chain, and the second radio frequency receive signaling chain;
    transmit a first indicator to the first wireless network at a first time that is based at least in part on a configuration processing delay for the first wireless network before initiating a tune-away event, the first indicator comprising information to cause the first wireless network to adjust one or more downlink transmission properties for communication to the single radio wireless communication device to correspond to use of fewer radio frequency receive signaling chains during the tune-away event than before the tune-away event;
    reconfigure at least one of the first radio frequency receive signaling chain and the second radio frequency receive signaling chain to communicate with the second wireless network during the tune-away event;
    transmit a second indicator to the first wireless network at a second time that is based at least in part on the configuration processing delay for the first wireless network before completing the tune-away event, the second indicator comprising information to cause the first wireless network to adjust one or more downlink transmission properties for communication to the single radio wireless communication device to correspond to use of more radio frequency receive signaling chains after the tune-away event than during the tune-away event; and
    reconfigure the at least one of the first radio frequency receive signaling chain and the second radio frequency receive signaling chain to communicate with the first wireless network after completing the tune-away event,
  wherein the configuration processing delay time comprises a time for the first wireless network to process a channel status report (CSR) from the single radio wireless communication device and respond with a corresponding reconfiguration of downlink communication to the single radio wireless communication device based on the CSR.

14. The single radio wireless communication device of claim 13, wherein the first indicator comprises a first CSR including a rank indication value of one, and the second indicator comprises a second CSR including a rank indication value equal to or greater than one.

15. The single radio wireless communication device of claim 13, wherein the first wireless network operates in accordance with a Long Term Evolution (LTE) wireless communication protocol, and the second wireless network operates in accordance with a Code Division Multiple Access (CDMA) 2000 1× wireless communication protocol, and wherein the second wireless network provides voice connections for a circuit-switched fallback (CSFB) procedure for the first wireless network.

16. The single radio wireless communication device of claim 13, wherein the first indicator transmitted to the first wireless network indicates the single radio wireless communication device is not configured to receive multiple input multiple output (MIMO) transmissions during the tune-away event, and the second indicator transmitted to the first wireless network indicates the single radio wireless communication device is configured to receive MIMO transmissions after completing the tune-away event.

17. The single radio wireless communication device of claim 13, wherein the processor is further configured to cause the single radio wireless communication device to:
  obtain the configuration processing delay time for the first wireless network;
  transmit the first indicator to the first wireless network before the tune-away event by at least the configuration processing delay time; and
  transmit the second indicator to the first wireless network before completing the tune-away event by at least the configuration processing delay time.

18. The single radio wireless communication device of claim 17, wherein the configuration processing delay time indicates a value for a delay period during which the first wireless network processes CSR information provided by the single radio wireless communication device to the first wireless network and responds with a corresponding change for a rank indication or a modulation coding scheme for downlink transmission to the single radio wireless communication device.

19. The single radio wireless communication device of claim 13, wherein the processor is further configured to cause the single radio wireless communication device to wait to initiate the tune-away event until receiving a response from the first wireless network, the response indicating a change in downlink transmission parameters for communication to the single radio wireless communication device.

20. A non-transitory computer-readable medium storing instructions that, when executed by one or more processors of a single radio wireless communication device, cause the single radio wireless communication device to:
  transmit a first indicator to a first wireless network at a first time that is based at least in part on a configuration processing delay time for the first wireless network before initiating a tune-away event, the first indicator comprising information to cause the first wireless network to adjust one or more downlink transmission properties for communication to the single radio wireless communication device during the tune-away event;

reconfigure at least one radio frequency receive signaling chain to communicate with a second wireless network during the tune-away event;

transmit a second indicator to the first wireless network at a second time that is based at least in part on the configuration processing delay time for the first wireless network before completing the tune-away event, the second indicator comprising information to cause the first wireless network to readjust the one or more downlink transmission properties for communication to the single radio wireless communication device after the tune-away event; and reconfigure the at least one radio frequency receive signaling chain to communicate with the first wireless network after completing the tune-away event, wherein the configuration processing delay time comprises a time for the first wireless network to process a channel status report (CSR) from the single radio wireless communication device and respond with a corresponding reconfiguration of downlink communication to the single radio wireless communication device based on the CSR.

* * * * *